United States Patent
Kawai et al.

(10) Patent No.: US 10,629,958 B2
(45) Date of Patent: Apr. 21, 2020

(54) AQUEOUS ELECTROLYTIC SOLUTION FOR POWER STORAGE DEVICE AND POWER STORAGE DEVICE INCLUDING SAID AQUEOUS ELECTROLYTIC SOLUTION

(71) Applicants: THE UNIVERSITY OF TOKYO, Tokyo (JP); KABUSHIKI KAISHA TOYOTA JIDOSHOKKI, Kariya-Shi, Aichi-Ken (JP)

(72) Inventors: Tomoyuki Kawai, Kariya (JP); Junichi Niwa, Kariya (JP); Atsuo Yamada, Tokyo (JP); Yuki Yamada, Tokyo (JP); Kenji Usui, Tokyo (JP)

(73) Assignees: THE UNIVERSITY OF TOKYO, Bunkyo-ku, Tokyo (JP); KABUSHIKI KAISHA TOYOTA JIDOSHOKKI, Kariya-shi, Achi-ken (JP)

( * ) Notice: Subject to any disclaimer, the term of this patent is extended or adjusted under 35 U.S.C. 154(b) by 221 days.

(21) Appl. No.: 15/543,285
(22) PCT Filed: Jan. 14, 2016
(86) PCT No.: PCT/JP2016/000167
§ 371 (c)(1),
(2) Date: Jul. 13, 2017
(87) PCT Pub. No.: WO2016/114141
PCT Pub. Date: Jul. 21, 2016

(65) Prior Publication Data
US 2017/0373351 A1 Dec. 28, 2017

(30) Foreign Application Priority Data
Jan. 14, 2015 (JP) ................ 2015-004889

(51) Int. Cl.
*H01M 4/02* (2006.01)
*H01M 10/26* (2006.01)
(Continued)

(52) U.S. Cl.
CPC ............ *H01M 10/26* (2013.01); *H01G 11/32* (2013.01); *H01G 11/58* (2013.01); *H01G 11/62* (2013.01);
(Continued)

(58) Field of Classification Search
CPC ....................................................... H01M 4/02
See application file for complete search history.

(56) References Cited

U.S. PATENT DOCUMENTS 6,645,667 B1    11/2003   Iwamoto et al.
2008/0280197 A1* 11/2008   Machida ................ H01M 4/13
                                           429/129
(Continued)

FOREIGN PATENT DOCUMENTS

CN    1319263 A    10/2001
JP    09-022722 A   1/1997
(Continued)

OTHER PUBLICATIONS

Perron et al., "Comparison of the thermodynamic and transport properties of lithium bis(trifluoromethylsulfonyl)imide (LiTFSI) with LiClO$_4$ and Bu$_4$NBr in water at 25° C.", Can. J. Chem., 75: pp. 1608-1614, (1997), 7 pages total.

(Continued)

*Primary Examiner* — Jacob B Marks
(74) *Attorney, Agent, or Firm* — Sughrue Mion, PLLC

(57) ABSTRACT

An objective is to provide a novel aqueous electrolytic solution constituting an aqueous power storage device that stably operates even at a high voltage.
An electrolytic solution for a power storage device contains water as a solvent and has a composition in which an amount of the solvent is not greater than 4 mol with respect to 1 mol of an alkali metal salt.

20 Claims, 13 Drawing Sheets

(51) Int. Cl.
| | | |
|---|---|---|
| H01M 10/36 | (2010.01) | |
| H01M 4/66 | (2006.01) | |
| H01G 11/58 | (2013.01) | |
| H01G 11/32 | (2013.01) | |
| H01G 11/62 | (2013.01) | |
| H01M 4/131 | (2010.01) | |
| H01G 11/30 | (2013.01) | |

(52) U.S. Cl.
CPC ........... H01M 4/661 (2013.01); H01M 4/662 (2013.01); H01M 10/36 (2013.01); *H01G 11/30* (2013.01); *H01M 4/131* (2013.01); *H01M 2300/0014* (2013.01); *Y02E 60/13* (2013.01)

(56) References Cited

U.S. PATENT DOCUMENTS

| | | | | |
|---|---|---|---|---|
| 2009/0186263 A1* | 7/2009 | Pozin | ...................... | H01M 6/16 429/94 |
| 2014/0377612 A1* | 12/2014 | Kwon | ............... | H01M 10/0422 429/94 |

FOREIGN PATENT DOCUMENTS

| | | |
|---|---|---|
| JP | 2007-112704 A | 5/2007 |
| JP | 2014-143097 A | 8/2014 |
| WO | 2013/094689 A1 | 6/2013 |
| WO | 2013/146792 A1 | 10/2013 |

OTHER PUBLICATIONS

Communication dated Nov. 28, 2018, issued by the State Intellectual Property Office of People's Republic of China in counterpart application No. 201680005593.8.

Li et al., "Surface tension of aqueous electrolyte solutions at high concentrations—representation and prediction", Chemical Engineering Science, vol. 56, 2001, pp. 2879-2888 (10 pages total).

Communication dated Jul. 6, 2018, issued by the Korean Intellectual Property Office in counterpart application No. 10-2017-7019436.

Communication dated Aug. 7, 2018, issued by the Japanese Patent Office in counterpart application No. 2016-569291.

International Search Report for PCT/JP2016/000167 dated Mar. 29, 2016.

* cited by examiner

Behavior of LTO Electrode in 5.0 mol / L LiTFSA Aqueous Solution
(Salt : Solvent = 1 : 2.9 (Mole Ratio))

1.0 mol / L LiTFSA Aqueous Solution
Salt : Solvent = 1 : 47.4 (Mole Ratio)

AQUEOUS ELECTROLYTIC SOLUTION FOR POWER STORAGE DEVICE AND POWER STORAGE DEVICE INCLUDING SAID AQUEOUS ELECTROLYTIC SOLUTION

CROSS REFERENCE TO RELATED APPLICATIONS

This application is a National Stage of International Application No. PCT/JP2016/000167 filed Jan. 14, 2016, claiming priority based on Japanese Patent Application No. 2015-004889 filed Jan. 14, 2015, the contents of all of which are incorporated herein by reference in their entirety.

TECHNICAL FIELD

The present invention relates to an aqueous electrolytic solution for a power storage device and a power storage device including the aqueous electrolytic solution.

BACKGROUND ART

Lithium ion secondary batteries have been widely used as batteries for mobile phones and electric vehicles, since lithium ion secondary batteries have high theoretical energy densities as compared to conventional secondary batteries. In conventional lithium ion secondary batteries, an organic solvent-based electrolytic solution that does not decompose even at a voltage of approximately 4 V is used in order to achieve a high energy density. As such an organic solvent, typically, ethylene carbonate, diethyl carbonate, etc. are mainly used (Patent Literature 1).

However, an organic solvent is generally combustible, and thus ensuring safety particularly in large-sized secondary batteries for vehicles and power storage is an important issue. In addition, the ionic conductivity of an organic solvent solution is very low as compared to that of an aqueous solution, so that rapid charging/discharging characteristics of the organic solvent solution are not sufficient, which is a problem. Meanwhile, in view of such a problem, research has been conducted for aqueous lithium ion secondary batteries in which an aqueous solution is used as an electrolytic solution. However, water theoretically decomposes at a voltage of 1.23 V, and thus an aqueous lithium ion secondary battery that stably operates even at a high voltage, for example, exceeding 2 V has not been achieved.

Capacitors are power storage devices which store or release charge by adsorption or elimination of ions in an electrolytic solution with respect to an electrode surface. Capacitors are roughly categorized into: organic solvent-type capacitors in which an organic solvent and a quaternary ammonium salt or the like are used for an electrolytic solution; and aqueous capacitors in which water is used as the solvent of an electrolytic solution.

The amount of charge that is stored in a capacitor is represented as a product of capacitance and voltage. Regarding an aqueous capacitor, the upper limit of the voltage is limited due to the withstand voltage of water, and thus studies for increasing the capacitance are generally conducted in order to increase the amount of charge.

As a matter of fact, Patent Literature 2 discloses a technique to optimize the pore size and the specific surface area of activated carbon to be used for an electrode of a capacitor, thereby increasing capacitance.

However, since the withstand voltage of water is low as described above, putting an aqueous capacitor that stably operates at a high voltage to practical use has been difficult.

CITATION LIST

Patent Literature

Patent Literature 1: JPH09-22722(A)
Patent Literature 2: JP2007-112704(A)

SUMMARY OF INVENTION

Technical Problem

Therefore, the objectives of the present invention are: to provide a novel aqueous electrolytic solution for a power storage device such as secondary batteries, including a lithium ion secondary battery, and capacitors; and to provide a power storage device in which the aqueous electrolytic solution is used and which stably operates even at a high voltage, which is not achieved by existing aqueous power storage devices.

Solution to Problem

For the purpose of solving the above described problems, the present inventors have conducted thorough research. As a result, the present inventors have discovered that an electrolytic solution that is an aqueous solution containing a high-concentration alkali metal salt has a potential window of not less than 2 V which greatly exceeds 1.23 V which is the theoretical potential window (stable potential range) of pure water and that an aqueous power storage device in which the electrolytic solution is used operates reversibly at a high voltage. Then, the present inventors have accomplished the present invention.

That is, an aspect of the present invention provides:

(1) an electrolytic solution for a power storage device, the electrolytic solution containing water as a solvent, wherein an amount of the solvent is not greater than 4 mol with respect to 1 mol of an alkali metal salt;

(2) the electrolytic solution for the power storage device according to the above (1), wherein an anion forming the alkali metal salt is an organic anion containing a carbon atom within a structure thereof;

(3) the electrolytic solution for the power storage device according to the above (2), wherein the organic anion is an organic anion having a fluoroalkyl group;

(4) the electrolytic solution for the power storage device according to the above (2), wherein the organic anion is bis(trifluoromethanesulfonyl)amide ($[N(CF_3SO_2)_2]^-$), bis(perfluoroethanesulfonyl)amide ($[N(C_2F_5SO_2)_2]^-$), and/or (perfluoromethanesulfonyl)(trifluoromethanesulfonyl)amide ($[N(C_2F_5SO_2)(CF_3SO_2)]^-$);

(5) the electrolytic solution for the power storage device according to the above (2), wherein the organic anion is bis(trifluoromethanesulfonyl)amide ($[N(CF_3SO_2)_2]^-$), bis(perfluoroethanesulfonyl)amide ($[N(C_2F_5SO_2)_2]^-$), (perfluoroethanesulfonyl)(trifluoromethanesulfonyl)amide ($[N(C_2F_5SO_2)(CF_3SO_2)]^-$), $CF_3SO_3^-$, and/or $C_2F_5SO_3^-$;

(6) the electrolytic solution for the power storage device according to any one of the above (1) to (5), wherein the alkali metal salt is a lithium salt or a sodium salt;

(7) the electrolytic solution for the power storage device according to any one of the above (1) to (6), wherein the alkali metal salt is a combination of two or more alkali metal salts;

(8) the electrolytic solution for the power storage device according to any one of the above (1) to (7), wherein the electrolytic solution has a potential window of not less than 2 V;

(9) the electrolytic solution for the power storage device according to any one of the above (1) to (8), wherein the power storage device is a secondary battery or a capacitor; and

(10) the electrolytic solution for the power storage device according to any one of the above (1) to (9), wherein the power storage device is a lithium ion secondary battery or a sodium ion secondary battery.

Another aspect of the present invention provides:

(11) a power storage device comprising a positive electrode, a negative electrode, and the electrolytic solution for the power storage device according to any one of the above (1) to (10);

(12) the power storage device according to the above (11), wherein the power storage device is a secondary battery or a capacitor;

(13) the power storage device according to the above (12), wherein the secondary battery is a lithium ion secondary battery or a sodium ion secondary battery;

(14) the power storage device according to the above (11), wherein the power storage device is a secondary battery, and the positive electrode contains an active material selected from a metal oxide having element lithium, a polyanion-based compound, or a sulfur-based compound;

(15) the power storage device according to the above (11), wherein the power storage device is a secondary battery and the positive electrode contains lithium manganate;

(16) the power storage device according to the above (11), wherein the power storage device is a secondary battery, and the negative electrode contains an active material selected from a carbon material, metal lithium, a lithium alloy, a sulfur-based compound, or a lithium metal oxide;

(17) the power storage device according to the above (11), wherein the power storage device is a secondary battery and the negative electrode contains lithium titanate;

(18) the power storage device according to the above (12), wherein the capacitor is anelectricdouble layer capacitor, alithium ion capacitor, or a sodium ion capacitor;

(19) the power storage device according to the above (11), wherein the power storage device is a capacitor, and the positive electrode and/or the negative electrode contains activated carbon; and

(20) the power storage device according to the above (11), further comprising a current collector made of aluminum, made of titanium, made of stainless steel, made of copper, and/or made of zinc.

Advantageous Effects of Invention

According to the present invention, by using, as an electrolytic solution, an aqueous solution containing a high-concentration alkali metal salt, particularly, an alkali metal salt of an organic anion and an alkali metal cation, an aqueous power storage device, such as a secondary battery including a lithium ion secondary battery and a sodium ion secondary battery, and a capacitor, in which an aqueous electrolytic solution is used and that stably operates even at a high voltage of not less than 2 V, which is difficult with a conventional aqueous electrolytic solution, is provided. This voltage greatly exceeds that of a lead storage battery which is an aqueous secondary battery which generates the highest voltage at present, and thus the aqueous secondary battery provided by the present invention is considered to have the highest voltage among the existing aqueous secondary batteries. Moreover, since an aqueous solution generally has higher ionic conductivity than an organic solution, an effect of enabling rapid charging/high current discharging is achieved.

In addition, the electrolytic solution of the present invention is an electrolytic solution obtained by combining water, which is a very cheap solvent, and an organic salt such as LiTFSA, which is used as a component in a conventional electrolytic solution. Thus, the electrolytic solution of the present invention is excellent in terms of cost. Furthermore, as described in Examples described later, the electrolytic solution of the present invention is applicable to an electrode configuration that has been put to practical use as a lithium ion secondary battery or a capacitor in which an existing organic electrolytic solution is used. Thus, an obstacle to putting the electrolytic solution to practical use is very low.

DESCRIPTION OF EMBODIMENTS

Figure 1:
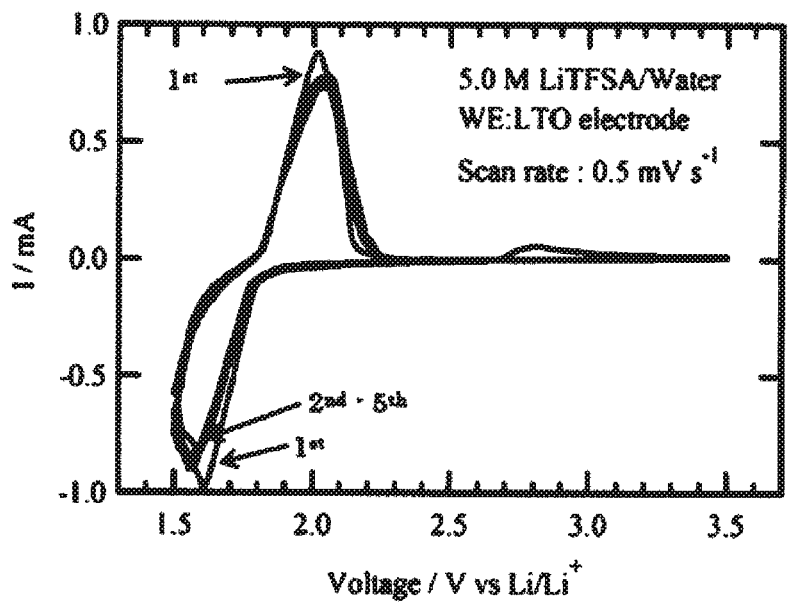
FIG. 1 is a graph showing measurement results of cyclic voltammetry in the case of using a 5.0 mol/L LiTFSA aqueous solution (lithium salt:solvent=1:2.9 (mole ratio)) as an electrolytic solution and lithium titanate (LTO) as a working electrode.

In the following, embodiments of the present invention are described. The scope of the present invention is not limited to the descriptions of the embodiments and various changes other than those illustrated in the following may be made as appropriate without departing from the gist of the present invention.

1. Electrolytic Solution (1) Solvent

The electrolytic solution for a power storage device of the present invention (hereinafter, sometimes referred to as "electrolytic solution of the present invention") is an aqueous electrolytic solution. Therefore, a main solvent used in the electrolytic solution for the power storage device of the present invention is water. However, the solvent may be a mixed solvent containing water and another solvent that is a nonaqueous solvent. Such a nonaqueous solvent is soluble in water, and examples thereof include: alcohols such as methanol; and aprotic polar solvents including acetone, acetonitrile, dimethyl sulfoxide, or carbonates such as dimethyl carbonate, ethyl methyl carbonate, diethyl carbonate, ethylene carbonate, and propylene carbonate. In the case of the mixed solvent, the proportion of water is preferably not less than 90% in volume ratio.

(2) Alkali Metal Salt

An alkali metal salt used in the electrolytic solution for the power storage device of the present invention is preferably a lithium salt or a sodium salt, but a salt of a metal belonging to Group 2, such as magnesium, may be used. The cation species of the alkali metal salt may be selected in accordance with the type of a charge carrier of a power storage device in which the electrolytic solution of the present invention is used. For example, a lithium salt is preferable when a secondary battery is a lithium ion secondary battery, and a sodium salt is preferable when the secondary battery is a sodium ion secondary battery. In addition, a mixture of a combination of two or more alkali metal salts may be used.

The anion forming the alkali metal salt is preferably an organic anion containing a carbon atom within the structure thereof.

As the organic anion, anions represented by the following general formula (1) to general formula (3) are preferable.

  general formula (1)

($R^1$ and $R^2$ are each independently selected from an alkyl group or a halogen-substituted alkyl group. $R^1$ and $R^2$ optionally bind with each other to form a ring.)

  general formula (2)

($R^3$ is selected from an alkyl group or a halogen-substituted alkyl group.)

  general formula (3)

($R^4$ is selected from an alkyl group or a halogen-substituted alkyl group.)

In the general formula (1) to general formula (3), the number n of carbon atoms in the alkyl group or the halogen-substituted alkyl group is preferably 1 to 6, more preferably 1 to 3, and further preferably 1 to 2. The halogen of the halogen-substituted alkyl group is preferably fluorine. The substitution number of halogen atoms in the halogen-substituted alkyl group is equal to or less than the number of hydrogen atoms in the original alkyl group.

$R^1$ to $R^4$ are each represented by the following general formula (1-1).

  general formula (1-1)

("n" is an integer not less than 1. "a", "b", "c", "d", and "e" are integers not less than 0. 2n+1=a+b+c+d+e is satisfied.)

In the general formula (1-1), from the standpoint of oxidation resistance, "a" is preferably smaller, a=0 is more preferable, and 2n+1=b is most preferable.

As the organic anion, an organic anion having a fluoroalkyl group is preferable. For example, bis(trifluoromethanesulfonyl)amide (TFSA; $[N(CF_3SO_2)_2]^-$), bis(perfluoroethanesulfonyl)amide (BETA; $[N(C_2F_5SO_2)_2]^-$), or (perfluoroethanesulfonyl) (trifluoromethanesulfonyl)amide ($[N(C_2F_5SO_2)(CF_3SO_2)]^-$) is suitable.

Therefore, specific examples of the alkali metal salt include lithium bis(trifluoromethanesulfonyl)amide (LiTFSA), lithium bis(perfluoroethanesulfonyl)amide (LiBETA), lithium (perfluoroethanesulfonyl) (trifluoromethanesulfonyl)amide, sodium bis(trifluoromethanesulfonyl)amide (NaTFSA), sodium bis(perfluoroethanesulfonyl)amide (NaBETA), and sodium (perfluoroethanesulfonyl) (trifluoromethanesulfonyl)amide.

Examples of other suitable organic anions include $CF_3SO_3^-$, $C_2F_5SO_3^-$, $CF_3CO_2^-$, and $C_2F_5CO_2^-$.

Specific examples of other alkali metal salts include $CF_3SO_3Li$, $C_2F_5SO_3Li$, $CF_3CO_2Li$, $C_2F_5CO_2Li$, $CF_3SO_3Na$, $C_2F_5SO_3Na$, $CF_3CO_2Na$, and $C_2F_5CO_2Na$.

In addition, the electrolytic solution for the power storage device of the present invention contains a high-concentration alkali metal salt. Accordingly, even with an electrode configuration with which reversible operation is not conventionally possible with an aqueous electrolytic solution, a power storage device such as a secondary battery that generates a high voltage is achieved. Regarding the mixing ratio of the alkali metal salt and the solvent in the electrolytic solution, the amount of the solvent is not greater than 4 mol and preferably not greater than 3.5 mol, with respect to 1 mol of the alkali metal salt. The lower limit of the amount of the solvent is not particularly limited as long as deposition of the alkali metal salt, etc. does not occur and electrochemical reaction at a positive electrode and a negative electrode proceeds. For example, the amount of the solvent is not less than 1 mol with respect to 1 mol of the alkali metal salt, and preferably not less than 2 mol with respect to 1 mol of the alkali metal salt. Since the high-concentration alkali metal salt is used, the electrolytic solution for the power storage device of the present invention has a potential window exceeding the potential window (stable potential range) of pure water and preferably has a potential window of not less than 2 V.

Furthermore, from the description of the present specification, an electrolytic solution for a power storage device, the electrolytic solution containing water as a solvent, the amount of the water being not greater than 4 mol with respect to 1 mol of an alkali metal salt, is understood as another mode of the electrolytic solution of the present invention.

In addition to the above-described alkali metal salt, a supporting electrolyte known in the art may be contained. Examples of such a supporting electrolyte in the case where the secondary battery is a lithium ion secondary battery include $LiPF_6$, $LiBF_4$, $LiClO_4$, $LiNO_3$, $LiCl$, $Li_2SO_4$, $Li_2S$, etc., and any combination selected therefrom.

(3) Other Components

In addition, the electrolytic solution for the power storage device of the present invention may contain other components as necessary for the purpose of improvement of the function of the electrolytic solution, etc. Examples of the other components include hitherto known overcharge inhibitors, deoxidizers, and characteristic improvement additives for improving cycle characteristics and capacity retention characteristics after storage at a high temperature.

When the electrolytic solution contains an overcharge inhibitor, the contained amount of the overcharge inhibitor in the electrolytic solution is preferably 0.01 to 5 mass %. When the overcharge inhibitor is contained in the electrolytic solution in an amount of not less than 0.1 mass %, preventing ruptures and ignition of a power storage device due to overcharge becomes easier, and the power storage device is more stably used.

Examples of the characteristic improvement additives for improving cycle characteristics and capacity retention characteristics after storage at a high temperature include: carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; and sulfur-containing compounds such as ethylene sulfite, 1,3-propanesultone, 1,4-butanesultone, methyl methanesulfonate, busulfan, sulfolane, sulfolene, dimethylsulfone, diphenyl sulfone, methyl phenyl sulfone, dibutyl disulfide, dicyclohexyl disulfide, tetramethylthiuram monosulfide, N,N-dimethyl methanesulfonamide, and N,N-diethyl methanesulfonamide. One of these characteristic improvement additives may be used singly, or two or more of these characteristic improvement additives may be used in combination. When the electrolytic solution contains a characteristic improvement additive, the contained amount of the characteristic improvement additive in the electrolytic solution is preferably 0.01 to 5 mass %.

2. Power Storage Device

The power storage device of the present invention includes a positive electrode, a negative electrode, and the electrolytic solution of the present invention. Examples of the power storage device include secondary batteries and capacitors.

(1) Negative Electrode

An electrode configuration known in the art may be used for the negative electrode in the power storage device of the present invention. Examples of the electrode in the case where the power storage device is a lithium ion secondary battery include an electrode including a negative electrode active material capable of electrochemically occluding and releasing lithium ions. As such a negative electrode active material, a known negative electrode active material for lithium ion secondary batteries may be used, and examples thereof include carbonaceous materials such as natural graphite (graphite), highly oriented graphite (Highly Oriented Pyrolytic Graphite; HOPG), and amorphous carbon. Other examples of the negative electrode active material include lithium metal, or alloys or metallic compounds, such as metal oxides, metal sulfides, and metal nitrides, each of which contains element lithium. Examples of the alloys containing element lithium include lithium aluminum alloys, lithium tin alloys, lithium lead alloys, and lithium silicon alloys. Examples of the metal oxides containing element lithium include lithium titanate ($Li_4Ti_5O_{12}$, etc.). Examples of the metal nitride containing element lithium include lithium cobalt nitride, lithium iron nitride, and lithium manganese nitride. Further examples of the negative electrode active material include sulfur-based compounds. In addition, metals such as iron or zinc may be used for the negative electrode. One of these negative electrode active materials may be used singly, or two or more of these negative electrode active materials may be used in combination. Among these negative electrode active materials, lithium titanate is preferable as the negative electrode active material in the case of a lithium ion secondary battery.

When the power storage device is a sodium ion secondary battery, an electrode including a negative electrode active material capable of electrochemically occluding and releasing sodium ions, may be used, and for example, sodium metal, or alloys or metallic compounds, such as metal oxides, metal sulfides, and metal nitrides, each of which contains element sodium, may be used instead of the above-described lithium metal or the like.

When the power storage device is an electric double layer capacitor, the negative electrode includes a polarizable electrode material. The polarizable electrode material may be a polarizable electrode material used for an ordinary electric double layer capacitor, and examples of the polarizable electrode material include activated carbon produced from various raw materials. The activated carbon is preferably activated carbon having a large specific surface area.

When the power storage device is a lithium ion capacitor or a sodium ion capacitor, the negative electrode includes a material capable of occluding and releasing lithium ions or sodium ions. Examples of the material include graphite-containing materials such as natural graphite or artificial graphite. In addition, a material, such as lithium titanate, which exhibits redox capacity at a certain potential by inserting and eliminating cation such as lithium ion, may be used. When a material not containing lithium is used as the negative electrode active material, a negative electrode or a positive electrode to which metal lithium or a compound containing lithium in a large amount is added and in which a negative electrode active material is doped in advance with lithium therefrom may be used.

When the power storage device is a secondary battery, the negative electrode may be a negative electrode including only the negative electrode active material, or may be in a form including, in addition to the negative electrode active material, at least one of a conductive material and a binding material (binder), attached to a negative electrode current collector as a negative electrode mixture. For example, when the negative electrode active material is in the form of a foil, a negative electrode only having the negative electrode active material may be formed. On the other hand, when the negative electrode active material is in the form of powder, a negative electrode having the negative electrode active material and the binding material (binder) may be formed. As a method for forming the negative electrode using a powder negative electrode active material, a doctor blade method, a molding method using compression bonding pressing, etc. may be used. The same applies to the case where the power storage device is a capacitor.

As the conductive material, for example, carbon materials, conductive fibers of metal fibers and the like, metal powders of copper, silver, nickel, aluminum, and the like, and organic conductive materials such as polyphenylene derivatives may be used. As a carbon material, graphite, soft carbon, hard carbon, carbon black, Ketchen black, acetylene black, graphite, activated carbon, carbon nanotube, carbon fiber, and the like may be used. Furthermore, mesoporous carbon obtained through baking petroleum pitch or a synthetic resin containing an aromatic ring, etc. may also be used.

As the binding agent, for example, a fluorine-based resin such as polyvinylidene fluoride (PVDF), polytetrafluoroethylene (PTFE), and ethylene tetrafluoroethylene (ETFE), polyethylene, polypropylene, or the like may be suitably used. As the negative electrode current collector, a rod-like body, a plate-like body, a foil-like body, a net-like body, or the like mainly formed from a metal such as copper, nickel, aluminum, zinc, titanium, platinum, and stainless steel may be used.

(2) Positive Electrode

An electrode configuration known in the art may be used for the positive electrode of the power storage device of the present invention. Examples of a positive electrode active material in the case where the power storage device is a lithium ion secondary battery include: lithium-containing transition metal oxides containing one or more transition metals, such as lithium cobaltate ($LiCoO_2$), lithium manganate ($LiMn_2O_4$), lithium nickelate ($LiNiO_2$), and $LiNi_{0.5}Mn_{1.5}O_4$; transition metal sulfides; metal oxides; lithium-containing polyanion-based compounds containing one or more transition metals such as iron phosphate lithium ($LiFePO_4$) and iron pyrophosphate lithium ($Li_2FeP_2O_7$); and sulfur-based compounds ($Li_2S$). The positive electrode may contain a conductive material or a binding agent.

In addition, oxygen or an oxygen-containing metal salt such as lithium oxide may be used as the positive electrode active material. The positive electrode including the positive electrode active material may contain a catalyst for accelerating redox reaction of oxygen in the positive electrode active material. Examples of preferable positive electrode active materials include transition metal oxides excessively containing lithium (the transition metal is, for example, manganese, cobalt, iron, nickel, or copper). Moreover, for efficiently causing redox of oxygen in the atmosphere to create a reaction field for taking out capacity, a material having a high specific surface area such as activated carbon may be used in the positive electrode.

Also when the power storage device is a sodium ion secondary battery, a known positive electrode active material may be used similarly.

When the power storage device is a capacitor, the positive electrode contains a polarizable electrode material. As the polarizable electrode material, the polarizable electrode material described for the negative electrode may be used. In addition, a material such as 2,2,6,6-tetramethylpiperidine-N-oxyl (TEMPO) used in a redox capacitor in which a large capacity is obtained through adsorption and desorption of anion, or a conductive polymer such as polyacene, may be used as the polarizable electrode material. Moreover, a material, such as lithium manganate having a spinel structure and iron phosphate lithium having an olivine structure, which exhibits redox capacity at a certain potential of not less than 3 V by inserting and eliminating cation such as lithium ion, may be included.

As the conductive material and the binding agent (binder), the same ones used for the negative electrode may be used.

As the catalyst for accelerating redox reaction of oxygen, $MnO_2$, $Fe_2O_3$, NiO, CuO, Pt, Co, and the like may be used. As the binding agent (binder), a binder that is the same as that for the negative electrode may be used.

As a positive electrode current collector, a rod-like body, a plate-like body, a foil-like body, a net-like body, or the like mainly formed from a metal such as nickel, aluminum, titanium, platinum, and stainless steel may be used. In addition, when the positive electrode active material is oxygen, a porous body such as a mesh-like (grid-like) metal, a sponge-like (foamed) metal, a punched metal, and an expanded metal is used as the positive electrode current collector, for the purpose of enhancing diffusion of oxygen. The metal is, for example, copper, nickel, aluminum, stainless steel, or the like.

(3) Separator

A separator used in the power storage device of the present invention is not particularly limited as long as the separator has a function of electrically separating a positive electrode layer and a negative electrode layer, and examples of the separator include porous insulators such as nonwoven fabrics including glass fiber nonwoven fabrics and nonwoven fabrics, and porous sheets formed of resins such as polyethylene (PE), polypropylene (PP), polyester, cellulose, and polyamide.

(4) Shape Etc.

The shape of the power storage device of the present invention is not particularly limited as long as the positive electrode, the negative electrode, and the electrolytic solution are housed, and examples thereof include a cylindrical type, a coin type, a plate type, and a laminated type.

Furthermore, a case for housing the power storage device may be an atmosphere-exposed type case, or may be a sealed type case.

In the case of an air battery in which a positive electrode active material is oxygen, an atmosphere-exposed type battery case is a battery case having a ventilation hole that allows air to flow in and out therethrough, enabling air to come into contact with the positive electrode. On the other hand, when the battery case is a sealed type battery case, a supply tube and an emission tube for gas (air) are preferably provided to the sealed type battery case. In this case, the gas that is to be supplied or emitted is preferably a dry gas in which the concentration of oxygen is preferably high, and is more preferably pure oxygen (99.99%). Furthermore, the oxygen concentration is preferably set high during discharging and set low during charging.

Although the electrolytic solution and the secondary battery of the present invention are suitable in usage as a secondary battery, usage as a primary battery is not excluded.

EXAMPLES

The present invention is described below in further detail by means of Examples, but is not limited thereto.

1. Measurement (Cyclic Voltammetry) of Electrochemical Behavior at Negative Electrode Material In order to demonstrate the applicability of the electrolytic solution of the present invention to a negative electrode, cyclic voltammetry was performed using an aqueous solution containing 5.0 mol/L of lithium bis(trifluoromethanesulfonyl)amide (LiTFSA) (salt:solvent=1:2.9 (mole ratio)) as an electrolytic solution to investigate current change. The measurement was performed using a three-electrode type electrochemical cell including lithium titanate (LTO) as a working electrode, platinum as a counter electrode, and Ag/AgCl (saturated KCl) as a reference electrode. The potential range was set to 1.5 to 3.5 V, and the sweep rate was set at 0.5 mV/second. The obtained results are shown in FIG. 1.

As shown in FIG. 1, even when the cyclic voltammetry measurement was performed with the aqueous solution containing high-concentration LiTFSA in LiTFSA:water=1:2.9 as an electrolytic solution until 5 cycles, reversible redox behavior was obtained. This demonstrates that LTO, of which reversible operation in an aqueous electrolytic solution has not been reported hitherto, operates reversibly by using an aqueous electrolytic solution containing a high-concentration alkali metal salt. This result indicates that in the electrolytic solution of the present invention, the stability of the reducing side dramatically improves, so that a negative electrode having a reaction potential of not greater than 2 V based on lithium metal is usable.

Figure 2:
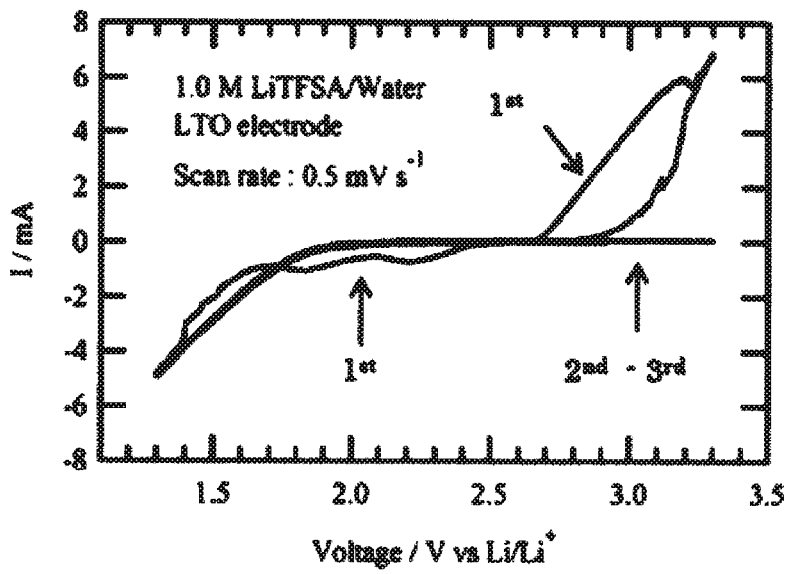
FIG. 2 is a graph showing measurement results of cyclic voltammetry in the case of using a 1.0 mol/L LiTFSA aqueous solution (lithium salt:solvent=1:47.4 (mole ratio)) as an electrolytic solution and lithium titanate (LTO) as a working electrode.
Figure 3:
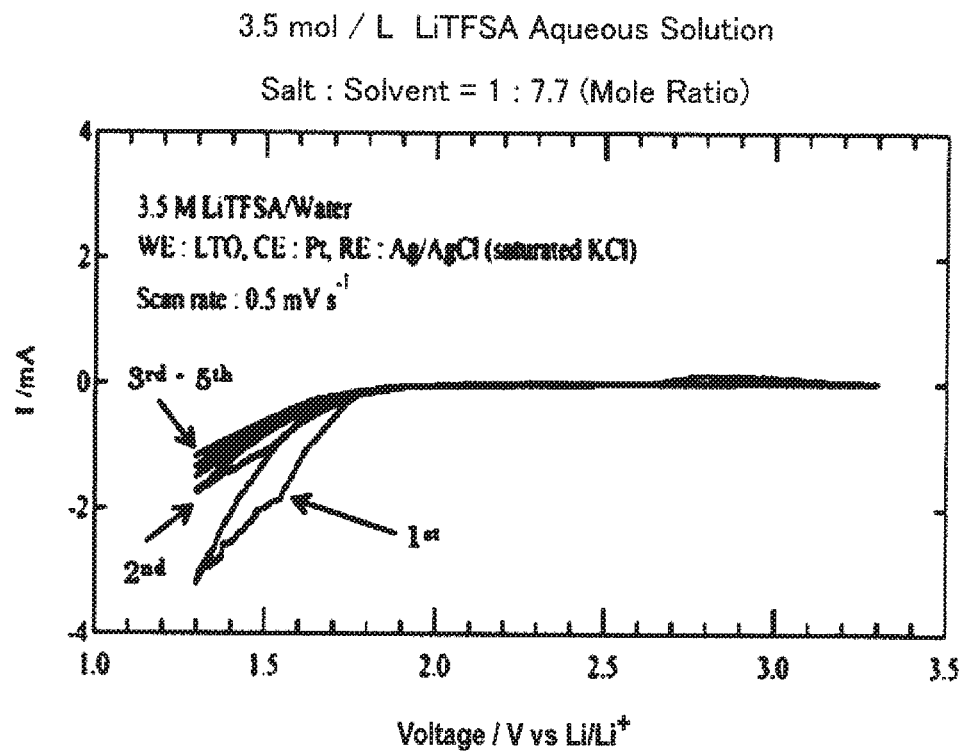
FIG. 3 is a graph showing measurement results of cyclic voltammetry in the case of using a 3.5 mol/L LiTFSA aqueous solution (lithium salt:solvent=1:7.7 (mole ratio)) as an electrolytic solution and lithium titanate (LTO) as a working electrode.

As a comparative example, cyclic voltammetry measurement was performed under the same conditions except that electrolytic solutions in which the concentrations of LiTFSA were set to 1.0 mol/L (salt:solvent=1:47.4 (mole ratio)) and 3.5 mol/L (salt:solvent=1:7.7 (mole ratio)) were used. The results are shown in FIG. 2 and FIG. 3. As a result, under these low-concentration conditions, reversible redox behavior as in FIG. 1 was not obtained.

Figure 4:
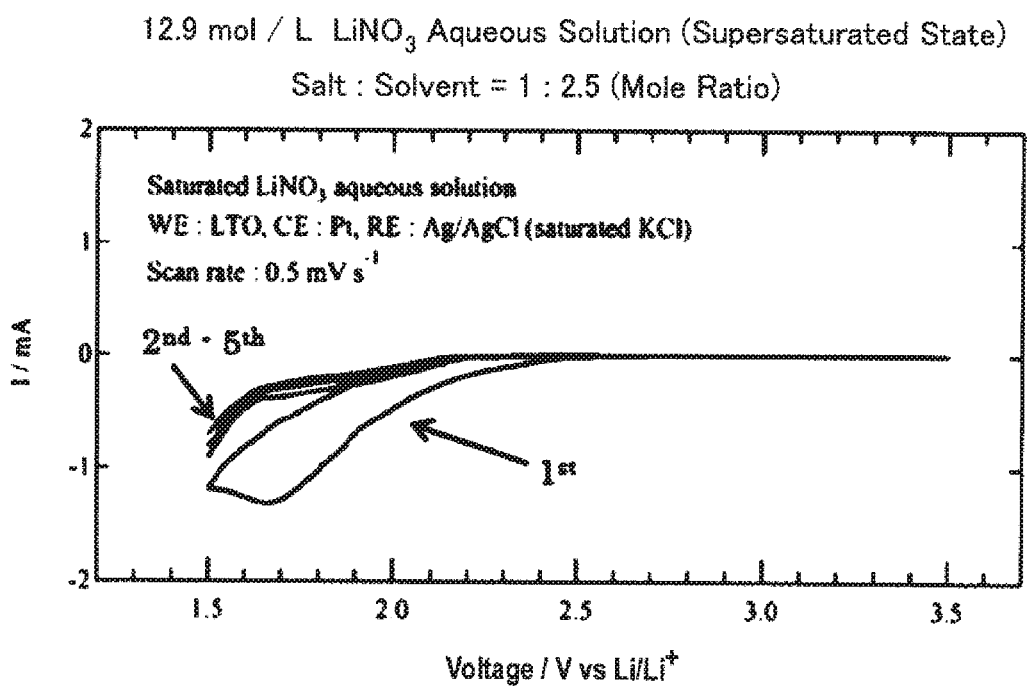
FIG. 4 is a graph showing measurement results of cyclic voltammetry in the case of using a 12.9 mol/L $LiNO_3$ supersaturated aqueous solution (lithium salt:solvent=1:2.5 (mole ratio)) as an electrolytic solution and lithium titanate (LTO) as a working electrode.

In addition, cyclic voltammetry measurement was performed under the same conditions except that the salt used in the electrolytic solution was changed to $LiNO_3$, which is an inorganic salt, and a 12.9 mol/L aqueous solution (lithium salt:solvent=1:2.5 (mole ratio)) was used as an electrolytic solution (a super saturated state). The results are shown in FIG. 4. Even though the high-concentration lithium salt was contained in lithium salt:solvent=1:2.5 (mole ratio) similarly to FIG. 1, when the inorganic salt was used, reversible redox behavior was not obtained.

Figure 5:
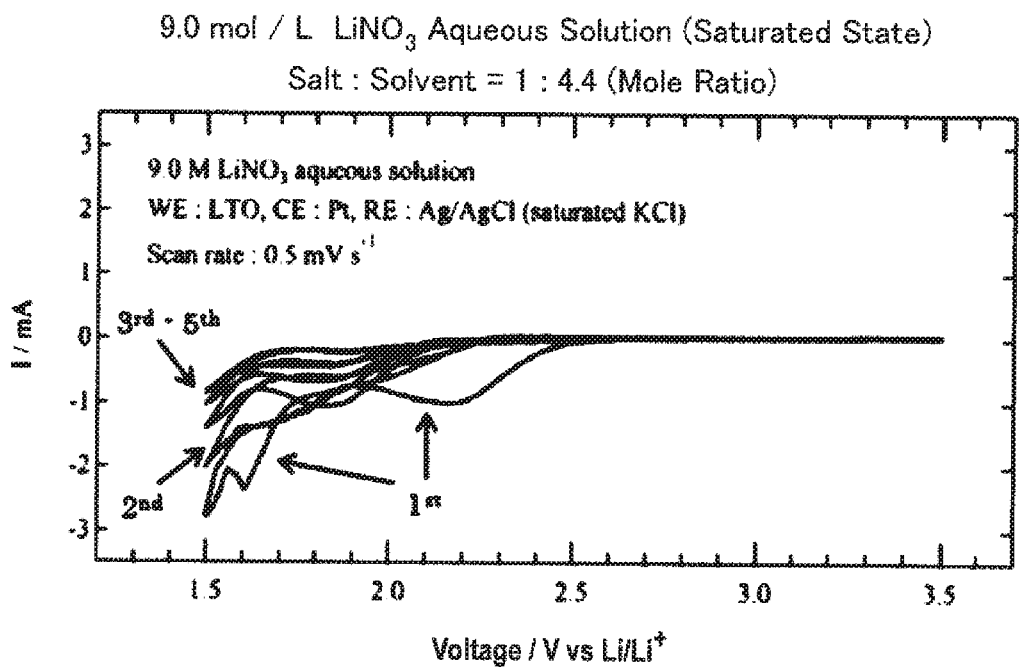
FIG. 5 is a graph showing measurement results of cyclic voltammetry in the case of using a 9.0 mol/L $LiNO_3$ saturated aqueous solution (lithium salt:solvent=1:4.4 (mole ratio)) as an electrolytic solution and lithium titanate (LTO) as a working electrode.

Furthermore, cyclic voltammetry measurement was performed under the same conditions except that a 9.0 mol/L $LiNO_3$ aqueous solution (lithium salt:solvent=1:4.4 (mole ratio)) that was substantially in a saturated state was used as an electrolytic solution. The results are shown in FIG. 5. When the inorganic salt was used, even though the concentration of the lithium salt was set high so as to obtain a saturated state, reversible redox behavior was not obtained.

2. Measurement (Cyclic Voltammetry) of Electrochemical Behavior at Positive Electrode Material Next, in order to demonstrate the applicability of the electrolytic solution of the present invention to a positive electrode, cyclic voltammetry measurement similar to that in FIG. 1 was performed using a three-electrode type electrochemical cell including lithium manganate ($LiMn_2O_4$) as a working electrode, platinum as a counter electrode, and Ag/AgCl (saturated KCl) as a reference electrode. The potential range was set to 3.6 to 4.7 V, and the sweep rate was set at 0.5 mV/second. The obtained results are shown in FIG. 6.

Figure 6:
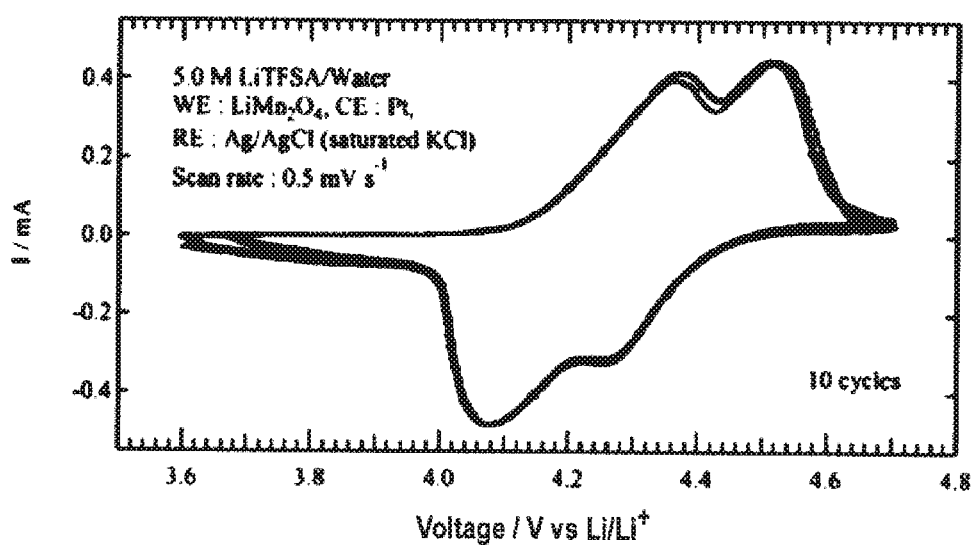
FIG. 6 is a graph showing measurement results of cyclic voltammetry in the case of using a 5.0 mol/L LiTFSA aqueous solution (lithium salt:solvent=1:2.9 (mole ratio)) as an electrolytic solution and lithium manganate ($LiMn_2O_4$) as a working electrode.

From the results of FIG. 6, reversible redox behavior was found to be exhibited even when cyclic voltammetry measurement was performed until 10 cycles. This result demonstrates that use of the electrolytic solution of the present invention allows a secondary battery, in which lithium manganate having approximately 4 V based on lithium metal is used as a positive electrode, to operate even when the secondary battery is an aqueous secondary battery.

3. Ionic Conductivity of Electrolytic Solution

The ionic conductivity of a 5.0 mol/L LiTFSA aqueous solution (salt:solvent=1:2.9 (mole ratio)) which is the electrolytic solution of the present invention was measured. AC impedance measurement (DC voltage: 0V, AC voltage amplitude: 5 mV) was performed using a two-electrode type electrochemical cell including opposed type platinum electrodes, and the ionic conductivity was evaluated on the basis of a resistance value at 10 kHz. The used electrochemical cell was an electrochemical cell with which a cell constant was measured in advance using a potassium chloride aqueous solution as a standard electrolytic solution. As a result, a value of 11.8 mS/cm was obtained at 25° C., and a value of 13.8 mS/cm was obtained at 30° C. This indicates that the aqueous solution containing high-concentration LiTFSA as a salt has conductivity at the same level as an organic solvent.

From the results described above, the aqueous electrolytic solution of the present invention was found to have a potential window (with respect to Li/Li$^+$) of not less than 2 V which greatly exceeds 1.23 V which is the theoretical potential window of pure water, so that reversible reaction is possible at both the positive electrode and the negative electrode. These results demonstrate that use of the electrolytic solution of the present invention allows achievement of an aqueous lithium ion secondary battery (or an aqueous sodium ion secondary battery) that generates a high voltage of not less than 2 V, which is conventionally impossible.

Figure 7:
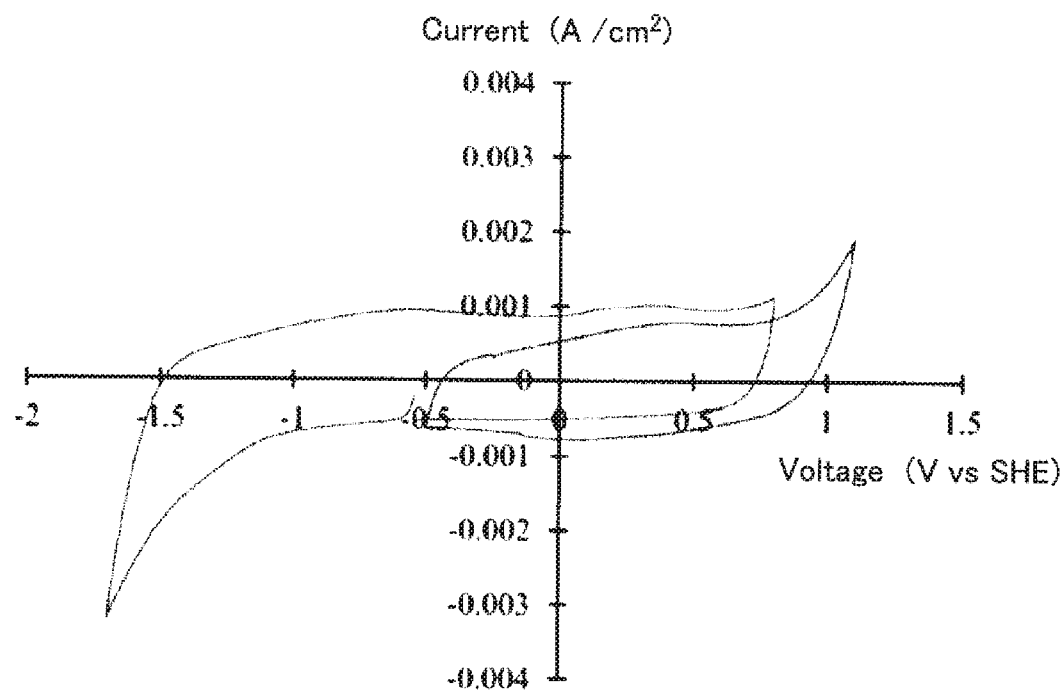
FIG. 7 is a graph showing measurement results of cyclic voltammetry in the case of using a 5.13 mol/L LiTFSA aqueous solution (salt:water=1:2.7 (mole ratio)) as an electrolytic solution and an electric double layer capacitor electrode containing a polarizable electrode material as a working electrode.

4. Measurement (Cyclic Voltammetry) of Electrochemical Behavior at Polarizable Electrode Material In order to demonstrate the applicability of the electrolytic solution of the present invention to a polarizable electrode material, cyclic voltammetry measurement was performed using an aqueous solution containing 5.13 mol/L of LiTFSA (salt:water=1:2.7 (mole ratio)) as an electrolytic solution to investigate current change. The measurement was performed using a three-electrode type electrochemical cell including: an electric double layer capacitor electrode (manufactured by Hohsen Corp.) including activated carbon as a polarizable electrode material, as a working electrode; platinum as a counter electrode; and Ag/AgCl (saturated KCl) as a reference electrode. The potential range was set to −1.7 V to 0.8 V as a voltage with respect to a standard hydrogen electrode, and was set to −0.5 V to 1.1 V as a voltage with respect to the standard hydrogen electrode. The sweep rate was set at 5 mV/second. The obtained results are shown in FIG. 7. In FIG. 7, the horizontal axis represents the voltage with respect to the standard hydrogen electrode.

As shown in FIG. 7, rapid current change did not occur at the reduction potential side until approximately −1.2 V and at the oxidation potential side until approximately 1 V. Therefore, the range of the potential window was confirmed to be approximately 2.2 V.

5. Evaluation 1 of Electric Double Layer Capacitor

An electric double layer capacitor having the following configuration was produced, and tested under the following conditions.

Positive electrode: an electric double layer capacitor electrode including a mixture layer containing 86 mass % of activated carbon, and an Al foil (manufactured by Hohsen Corp.: the density of the mixture layer is 0.63 g/cm$^3$).

Negative electrode: an electric double layer capacitor electrode including a mixture layer containing 86 mass % of activated carbon, and an Al foil (manufactured by Hohsen Corp.: the density of the mixture layer is 0.63 g/cm$^3$).

Electrolytic solution: an aqueous solution containing 5.13 mol/L of LiTFSA (salt:water=1:2.7 (mole ratio)).

Conditions: As conditioning, charging and discharging was performed 10 times at a current of 10 mA/g and in a voltage range of 0 to 1 V on the electric double layer capacitor. Charging and discharging was repeated 50 times at a current of 10 mA/g and in a voltage range of 0 to 2 V on the electric double layer capacitor after the conditioning. In addition, charging and discharging was repeated 50 times at a current of 10 mA/g and in a voltage range of 0 to 2.2 V on the electric double layer capacitor after the conditioning.

Figure 8:
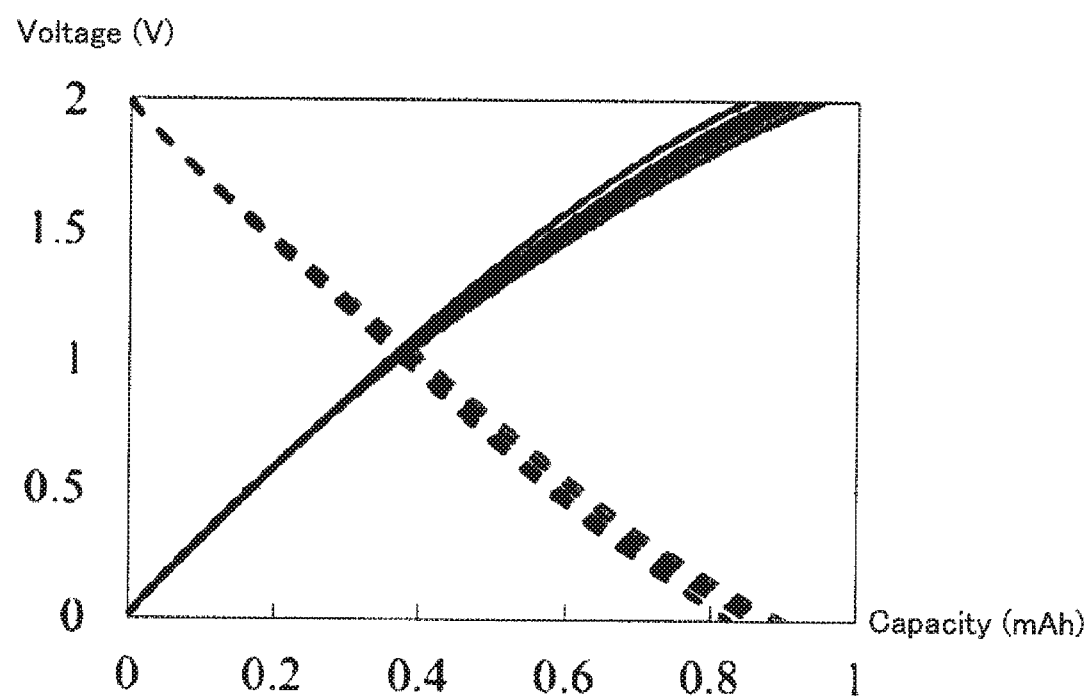
FIG. 8 shows charging/discharging curves, in a voltage range of 0 to 2 V, of an electric double layer capacitor using a 5.13 mol/L LiTFSA aqueous solution (salt:water=1:2.7 (mole ratio)) as an electrolytic solution.
Figure 9:
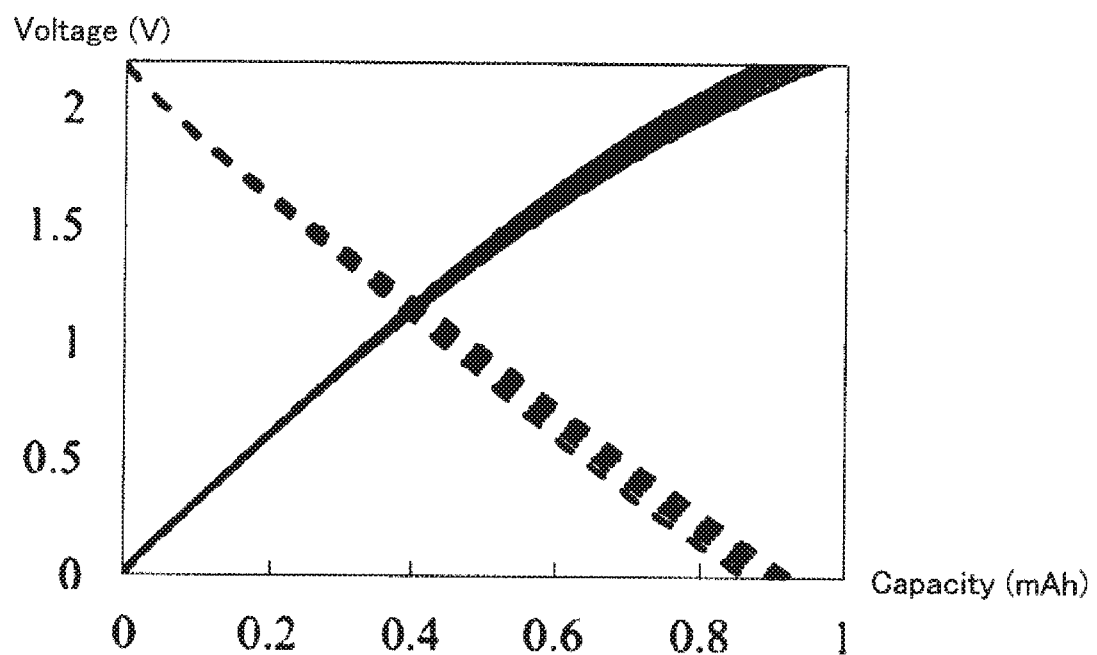
FIG. 9 shows charging/discharging curves, in a voltage range of 0 to 2.2 V, of the electric double layer capacitor using the 5.13 mol/L LiTFSA aqueous solution (salt:water=1:2.7 (mole ratio)) as the electrolytic solution.

FIG. 8 shows charging/discharging curves in the voltage range of 0 to 2 V, and FIG. 9 shows charging/discharging curves in the voltage range of 0 to 2.2 V. From the charging/discharging curves in FIG. 8 and FIG. 9, slight decrease in capacity was observed when charging and discharging was repeated, and curve disturbance that represents decomposition behavior of the electrolytic solution was not observed even through 50 times of charging and discharging. The electrolytic solution of the present invention was confirmed to withstand use in a capacitor not only at 2 V but also at 2.2 V.

Figure 10:
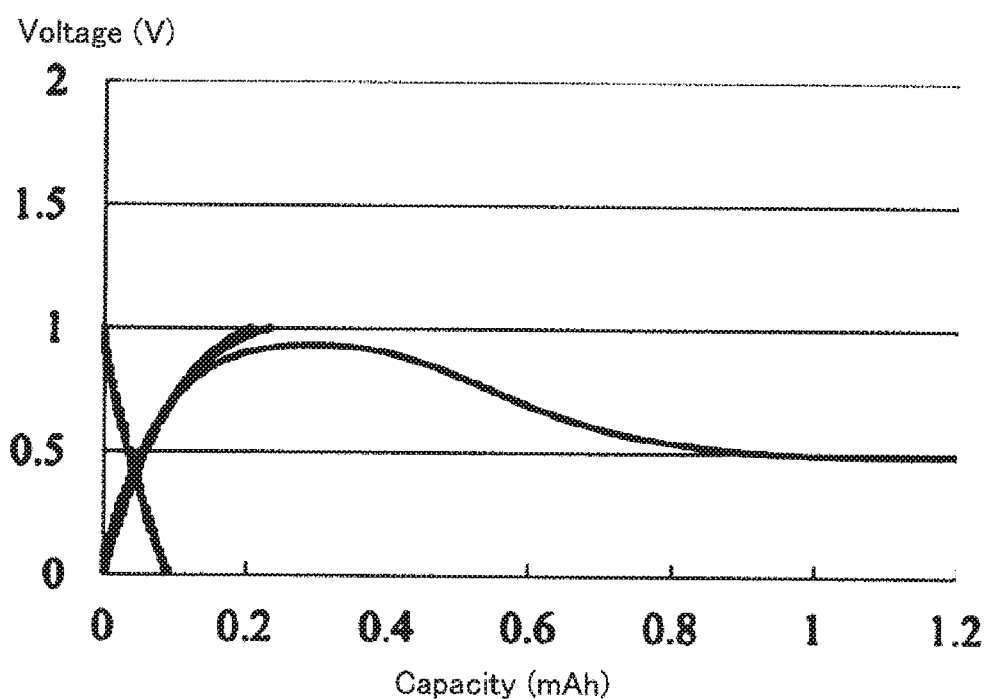
FIG. 10 shows charging/discharging curves, at a stage of conditioning, of an electric double layer capacitor using a 1.0 mol/L LiTFSA aqueous solution (salt:water=1:47.4 (mole ratio)) as an electrolytic solution.

As a comparative example, an electric double layer capacitor in which an aqueous solution containing 1.0 mol/L of LiTFSA (salt:water=1:47.4 (mole ratio)) was used was produced, and tested under the above conditions. However, as shown in FIG. 10, the electrolytic solution of the comparative example exhibited decomposition behavior during charging and discharging for the third time at the stage of conditioning, and the capacitor itself expanded. Thus, the test for the capacitor was ceased. In the capacitor of the comparative example, decomposition of water is thought to have occurred.

6. Evaluation 2 of Electric Double Layer Capacitor

An electric double layer capacitor having the following configuration was produced, and tested under the following conditions.

Positive electrode: an electric double layer capacitor electrode including a mixture layer containing 86 mass % of activated carbon, and an Al foil (manufactured by Hohsen Corp.: the density of the mixture layer is 0.63 g/cm$^3$).

Negative electrode: an electric double layer capacitor electrode including a mixture layer containing 86 mass % of activated carbon, and an Al foil (manufactured by Hohsen Corp.: the density of the mixture layer is 0.63 g/cm$^3$).

Electrolytic solution: an aqueous solution containing 5.25 mol/L of LiTFSA (salt:water=1:2.4 (mole ratio)).

Conditions: As conditioning, charging and discharging was performed 10 times at a current of 10 mA/g and in a voltage range of 0 to 1 V on the electric double layer capacitor. Charging and discharging was repeated five times at each current and in each voltage range described below, on the electric double layer capacitor after the conditioning.

Current: 100 mA/g, 500 mA/g, 1000 mA/g, 2000 mA/g, approximately 3500 mA/g

Voltage range: 0 to 2.3 V, 0 to 2.4 V, 0 to 2.5 V, 0 to 2.6 V, 0 to 2.7 V

Figure 11:
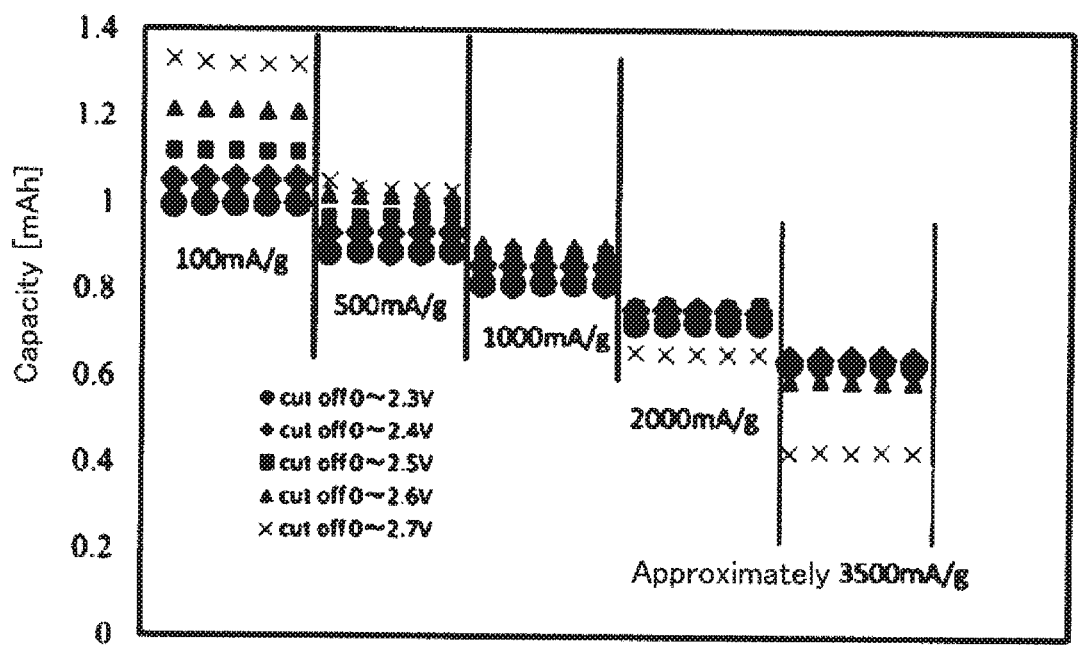
FIG. 11 is a graph showing capacity at each charging and discharging, at each current and in each voltage range, of an electric double layer capacitor using a 5.25 mol/L LiTFSA aqueous solution (salt:water=1:2.4 (mole ratio)) as an electrolytic solution.

FIG. 11 shows a graph of capacity of the capacitor at each charging and discharging at each current and in each voltage range. In addition, FIG. 12 shows a charging/discharging curve of the capacitor at a current of 100 mA/g and in a voltage range of 0 to 2.7V, and FIG. 13 shows a charging/discharging curve of the capacitor at a current of 100 mA/g and in a voltage range of 0 to 2.5 V.

Figure 12:
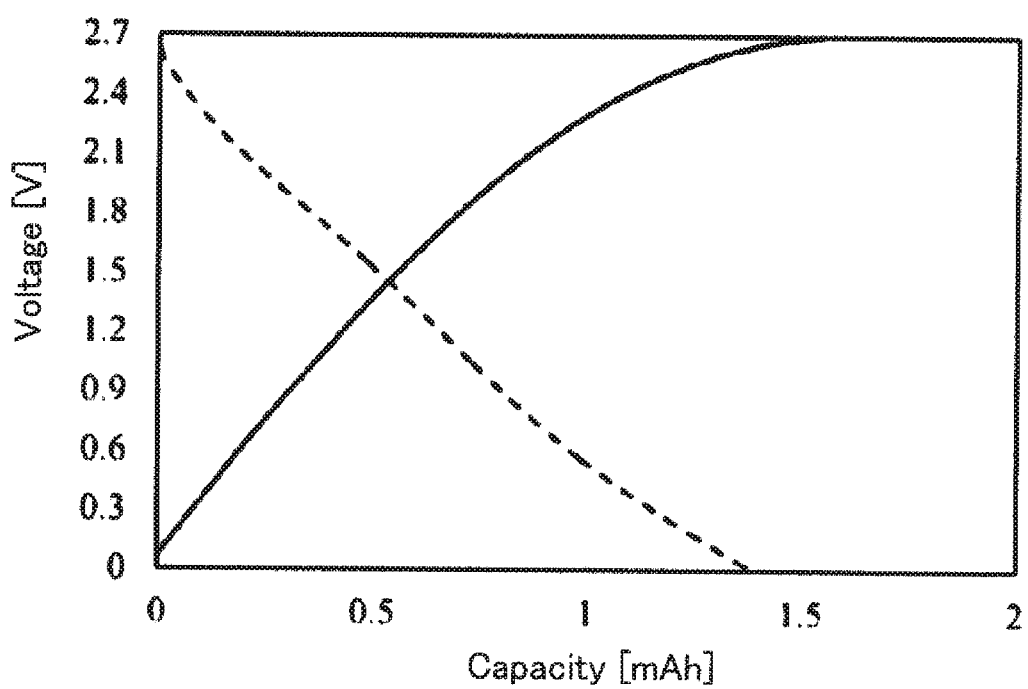
FIG. 12 shows a charging/discharging curve, at a current of 100 mA/g and in a voltage range of 0 to 2.7 V, of the electric double layer capacitor using the 5.25 mol/L LiTFSA aqueous solution (salt:water=1:2.4 (mole ratio)) as the electrolytic solution.
Figure 13:
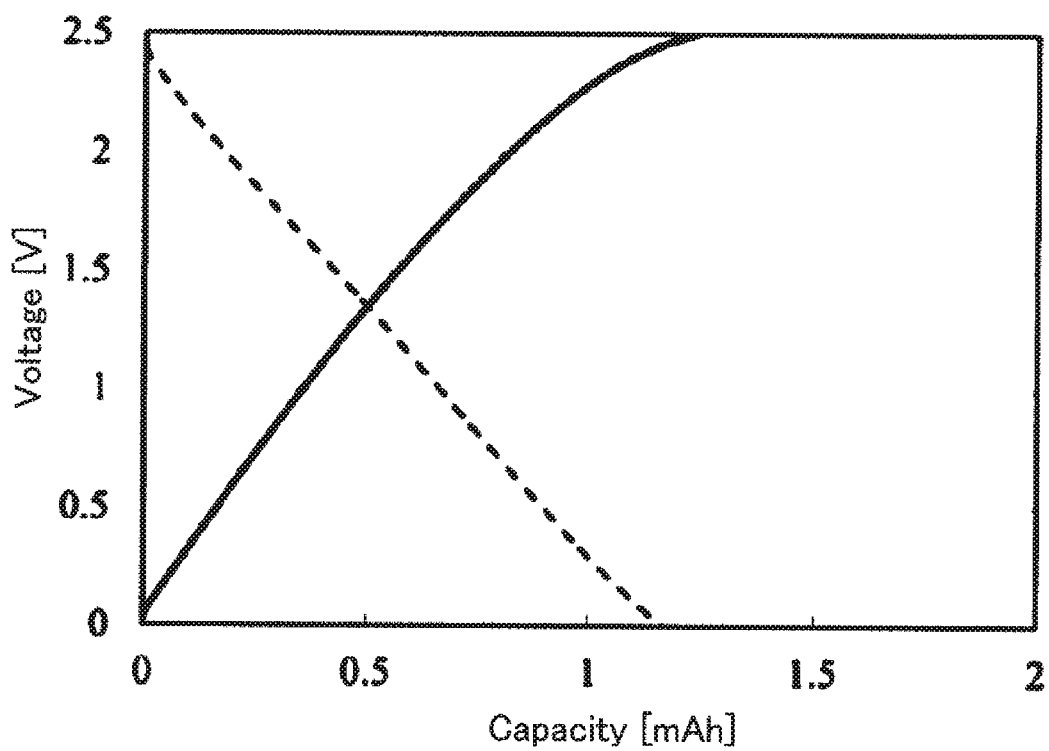
FIG. 13 shows a charging/discharging curve, at a current of 100 mA/g and in a voltage range of 0 to 2.5 V, of the electric double layer capacitor using the 5.25 mol/L LiTFSA aqueous solution (salt:water=1:2.4 (mole ratio)) as the electrolytic solution.

From FIG. 11 and FIG. 12, the capacitor is found to function even at a voltage of up to 2.7 V. That is, the electrolytic solution of the present invention is considered to withstand use in a capacitor at least up to 2.7 V. In addition, when the capacity at 100 mA/g is compared among the respective voltage ranges in FIG. 11, the capacity increases as the voltage range widens. Therefore, the amount of charge that is stored in the capacitor is considered to have been significantly increased by the electrolytic solution of the present invention which significantly increases the voltage as compared to a conventional aqueous solution. Furthermore, in FIG. 11, the decrease in capacity when the current is increased is small particularly in the voltage range of 0 to 2.5 V and the lower voltage ranges. Thus, the electrolytic solution of the present invention is considered to have excellent rate characteristics at least until 2.5 V.

Figure 14:
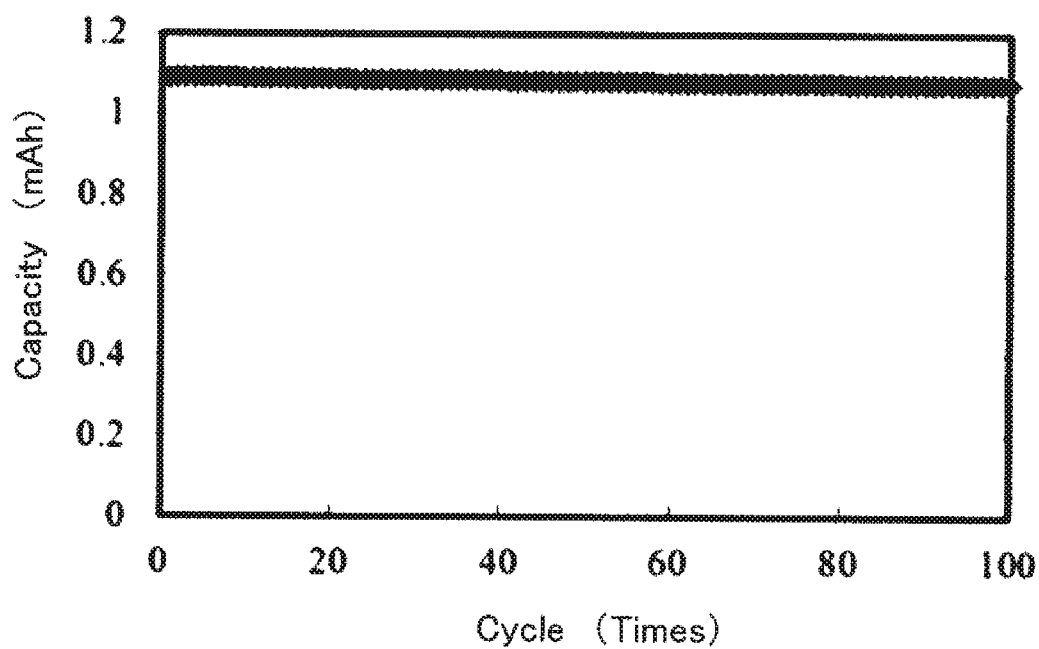
FIG. 14 is a graph showing a relationship between the number of times of charging and discharging (cycle number) and capacity when charging and discharging was repeated 100 times at a current of 100 mA/g and in a voltage range of 0 to 2.5 V on the electric double layer capacitor using the 5.25 mol/L LiTFSA aqueous solution (salt:water=1:2.4 (mole ratio)) as the electrolytic solution.

FIG. 14 shows a relationship between the number of times of charging and discharging (cycle number) and capacity when charging and discharging was repeated 100 times at a current of 100 mA/g and in a voltage range of 0 to 2.5 V on the electric double layer capacitor after the conditioning. From the results of FIG. 14, the capacitor including the electrolytic solution of the present invention is confirmed to undergo repeated charging and discharging, while stably maintaining the capacity, even under the condition of 2.5 V which is a voltage at the same level as that in an organic solvent-based capacitor.

7. Aluminum Corrosiveness Evaluation

Figure 15:
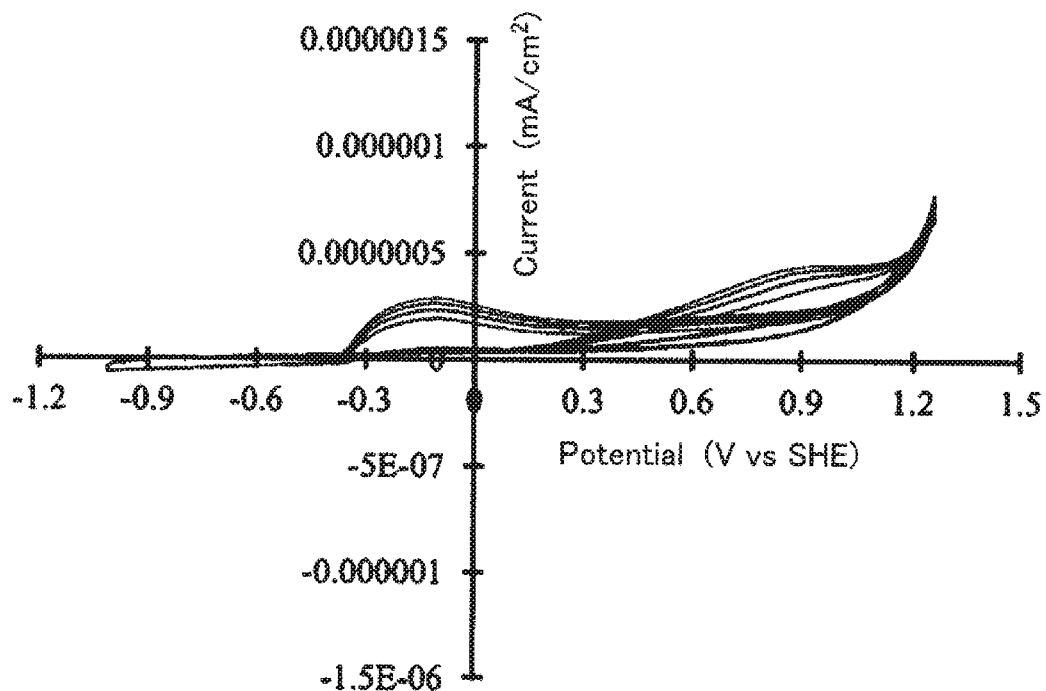
FIG. 15 is a graph showing measurement results of cyclic voltammetry in the case of using a 5.25 mol/L LiTFSA aqueous solution (salt:water=1:2.4 (mole ratio)) as an electrolytic solution and an aluminum foil as a working electrode.

In order to evaluate aluminum corrosiveness of the electrolytic solution of the present invention, cyclic voltammetry was performed using an aqueous solution containing 5.25 mol/L of LiTFSA (salt:water=1:2.4 (mole ratio)) as an electrolytic solution to investigate current change. As a working electrode, an electrode obtained by stacking four aluminum foils each having an area of 1 $cm^2$ and a thickness of 15 μm was used. The measurement was performed using a three-electrode type electrochemical cell including the working electrode, platinum as a counter electrode, and Ag/AgCl (saturated KCl) as a reference electrode. The potential range was set to −1.0 V to 1.2 V as a voltage with respect to a standard hydrogen electrode. The sweep rate was set at 5 mV/second. The obtained results are shown in FIG. 15. In FIG. 15, the horizontal axis represents the voltage with respect to the standard hydrogen electrode.

From FIG. 15, almost no current is found to have flowed at the reducing side. Even in the presence of aluminum, if the voltage is within the above range, water contained in the electrolytic solution of the present invention is considered not to be decomposed. From FIG. 15, at the oxidizing side, occurrence of slight current was observed, and the current value converged to a certain value as the cycle of the cyclic voltammetry progressed. This current is thought to be due to oxidation of aluminum, and the oxidation of aluminum is considered to be temporary since the current value converged. When these results are considered together, the electrolytic solution of the present invention is considered to be usable even in the presence of aluminum, without excessively corroding aluminum.

8. Confirmation of Effect of Combined Use of Multiple Alkali Metal Salts

8-1. Solubility of LiTFSA and LiBETA in Water

Figure 16:
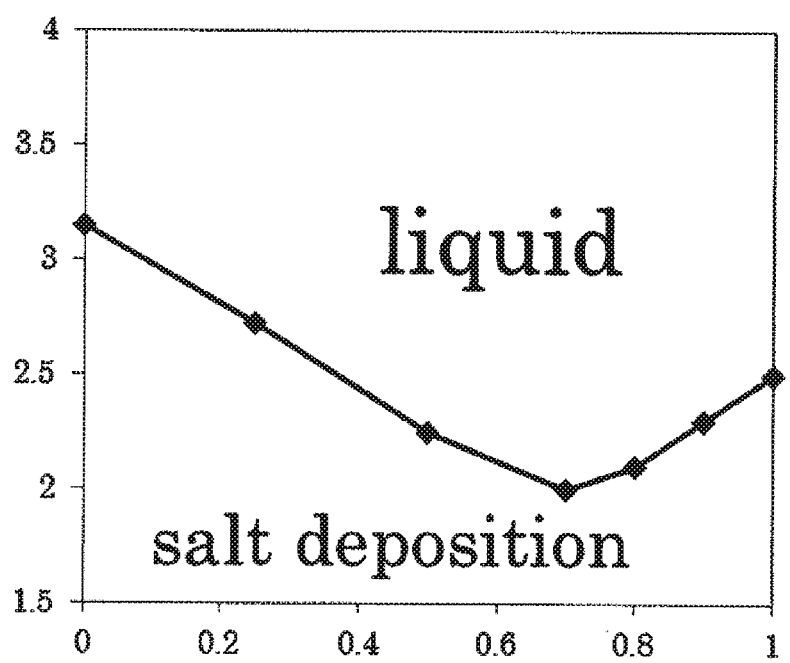
FIG. 16 is a graph regarding "8-1. Solubility of LiTFSA and LiBETA in Water", wherein the vertical axis represents (number of moles of water)/(number of moles of alkali metal salt) and the horizontal axis represents the mole ratio of LiTFSA with respect to the alkali metal salt.

Water was gradually added to alkali metal salts weighed in mole ratios described in Table 1, and the mixtures were heated and stirred, to prepare electrolytic solutions No. 1 to No. 7 as saturated alkali metal salt aqueous solutions at room temperature. Each of the electrolytic solutions No. 1 to No. 7 is the electrolytic solution of the present invention. FIG. 16 shows a graph in which the vertical axis represents (number of moles of water)/(number of moles of alkali metal salt) and the horizontal axis represents the mole ratio of LiTFSA relative to the alkali metal salt.

TABLE 1

|   | LiTFSA | LiBETA | (Number of moles of water)/(number of moles of alkali metal salt) |
|---|---|---|---|
| No. 1 | 1 | 0 | 2.5 |
| No. 2 | 0.9 | 0.1 | 2.3 |
| No. 3 | 0.8 | 0.2 | 2.1 |
| No. 4 | 0.7 | 0.3 | 2 |
| No. 5 | 0.5 | 0.5 | 2.25 |
| No. 6 | 0.25 | 0.75 | 2.73 |
| No. 7 | 0 | 1 | 3.15 |

From the results of Table 1 and FIG. 16, the saturated aqueous solutions in which multiple alkali metal salts were used in combination are found to contain a smaller amount of water than the saturated aqueous solutions containing a single alkali metal salt.

8-2. Solubility of LiTFSA and $CF_3SO_3Li$ in Water

Figure 17:
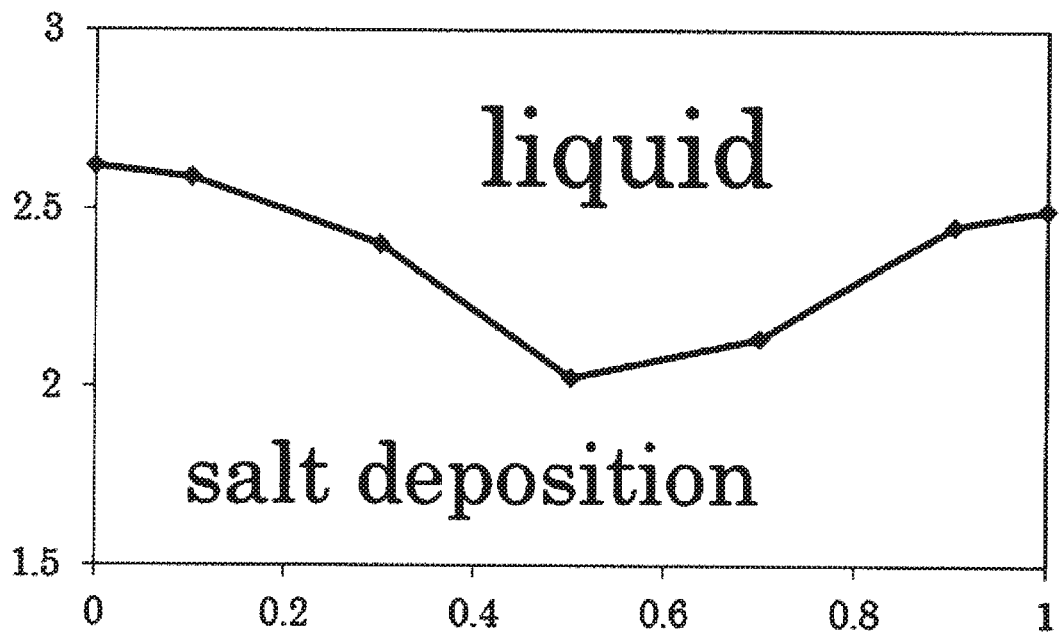
FIG. 17 is a graph regarding "8-2. Solubility of LiTFSA and $CF_3SO_3Li$ in Water", wherein the vertical axis represents (number of moles of water)/(number of moles of alkali metal salt) and the horizontal axis represents the mole ratio of LiTFSA with respect to the alkali metal salt.

Water was gradually added to alkali metal salts weighed in mole ratios described in Table 2, and the mixtures were heated and stirred, to prepare electrolytic solutions No. 8 to No. 14 as saturated alkali metal salt aqueous solutions at room temperature. Each of the electrolytic solutions No. 8 to No. 14 is the electrolytic solution of the present invention. FIG. 17 shows a graph in which the vertical axis represents (number of moles of water)/(number of moles of alkali metal salt) and the horizontal axis represents the mole ratio of LiTFSA relative to the alkali metal salt.

TABLE 2

|   | LiTFSA | $CF_3SO_3Li$ | (Number of moles of water)/(number of moles of alkali metal salt) |
|---|---|---|---|
| No. 8 | 1 | 0 | 2.50 |
| No. 9 | 0.9 | 0.1 | 2.45 |
| No. 10 | 0.7 | 0.3 | 2.14 |
| No. 11 | 0.5 | 0.5 | 2.03 |
| No. 12 | 0.3 | 0.7 | 2.40 |
| No. 13 | 0.1 | 0.9 | 2.59 |
| No. 14 | 0 | 1 | 2.62 |

From the results of Table 2 and FIG. 17, the saturated aqueous solutions in which multiple alkali metal salts were used in combination are found to contain a smaller amount of water than the saturated aqueous solutions containing a single alkali metal salt.

8-3. Confirmation of Potential Window

With respect to the electrolytic solution No. 4, cyclic voltammetry measurement was performed using the following three-electrode type electrochemical cell to confirm the potential window of the electrolytic solution No. 4. The measuring temperature was set at 25° C., and the sweep rate was set at 0.1 mV/second. The concentration of the alkali metal salts in the electrolytic solution No. 4 is 5.05 mol/L.

Working Electrode and Counter Electrode: Platinum

Reference Electrode: Ag/AgCl (Saturated KCl)

As a comparative example, cyclic voltammetry measurement of a three-electrode type electrochemical cell in which an aqueous solution containing 1.0 mol/L of LiTFSA (salt:water=1:47.4 (mole ratio)) was used, was performed by the above-described method.

Figure 18:
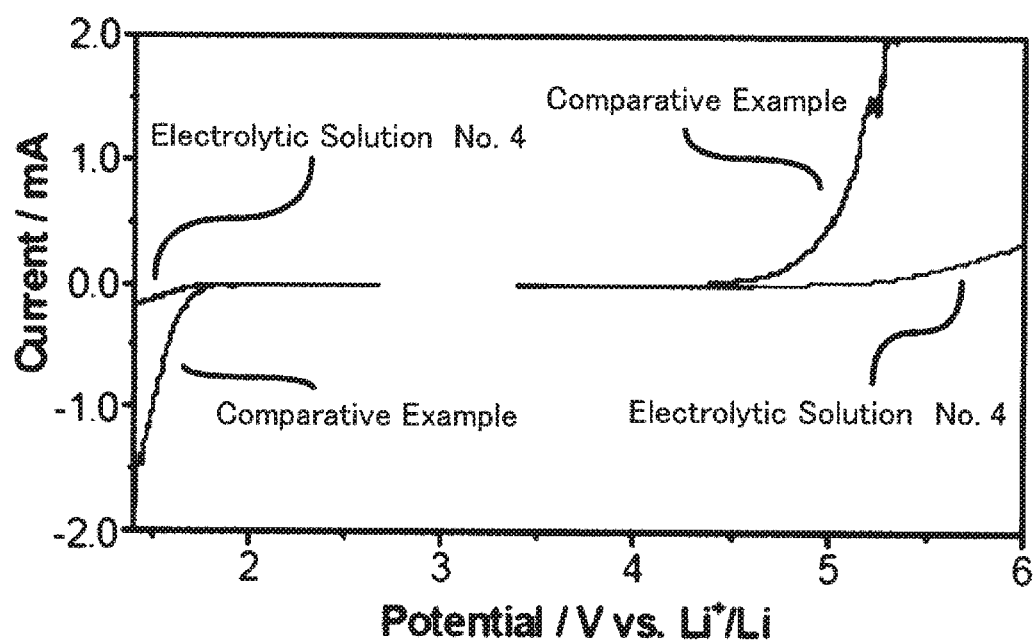
FIG. 18 is a graph showing measurement results of cyclic voltammetry in "8-3. Confirmation of Potential Window"

The results of the above are shown in FIG. 18. From the results of FIG. 18, the potential window of the electrolytic solution No. 4 was calculated as 3.2 V. In addition, as compared to the comparative example, the potential window read from a rising part of the response current of the electrolytic solution No. 4 is found to expand toward the high potential side at the oxidizing side and toward the low potential side at the reducing side, and particularly the expansion toward the high potential side at the oxidizing side is found to be significant. The potential window of the electrolytic solution of the present invention is reconfirmed to be large. Furthermore, from FIG. 18, the increase rate of the response current at higher potential from the potential at the rising part of the response current is considered to be gentle in the electrolytic solution No. 4. At potentials at the oxidizing side and the reducing side exceeding the potential window, the degree of decomposition of the electrolytic solution of the present invention is considered to be reduced.

8-4. Measurement of Electrochemical Behavior at Positive Electrode Material and Negative Electrode Material The following three-electrode type electrochemical cells 1 to 3 in which the electrolytic solution No. 4 was used were produced, and cyclic voltammetry measurement was performed with respect to these cells. The measuring temperature was set at 25° C., and the sweep rate was set at 0.1 mV/second.

<Three-Electrode Type Electrochemical Cell 1>

Working electrode: an electrode including a negative electrode mixture layer containing 85 mass % of $Li_4Ti_5O_{12}$, 5 mass % of PVDF, and 10 mass % of acetylene black, and a current collector made of Zn.

Counter electrode: an electrode including a mixture layer containing 85 mass % of $LiMn_2O_4$, 10 mass % of PVDF, and 5 mass % of acetylene black, and a current collector made of Ti.

Reference Electrode: Ag/AgCl (Saturated KCl)

<Three-Electrode Type Electrochemical Cell 2>

Working electrode: an electrode including apositive electrode mixture layer containing 85 mass % of $LiCoO_2$, 9 mass % of PVDF, and 6 mass % of acetylene black, and a current collector made of Ti.

Counter electrode: an electrode including a mixture layer containing 85 mass % of $LiMn_2O_4$, 10 mass % of PVDF, and 5 mass % of acetylene black, and a current collector made of Ti.

Reference electrode: Ag/AgCl (saturated KCl)

<Three-Electrode Type Electrochemical Cell 3>

Working electrode: an electrode including a positive electrode mixture layer containing 80 mass % of $LiNi_{0.5}Mn_{1.5}O_4$, 15 mass % of PVDF, and 5 mass % of acetylene black, and a current collector made of Ti.

Counter electrode: an electrode including a mixture layer containing 85 mass % of $LiMn_2O_4$, 10 mass % of PVDF, and 5 mass % of acetylene black, and a current collector made of Ti.

Reference electrode: Ag/AgCl (saturated KCl)

As a comparative example, cyclic voltammetry measurement of three-electrode type electrochemical cells 1 to 3 in which an aqueous solution containing 1.0 mol/L of LiTFSA (salt:water=1:47.4 (mole ratio)) was used, was performed by each of the above-described methods.

Figure 19:
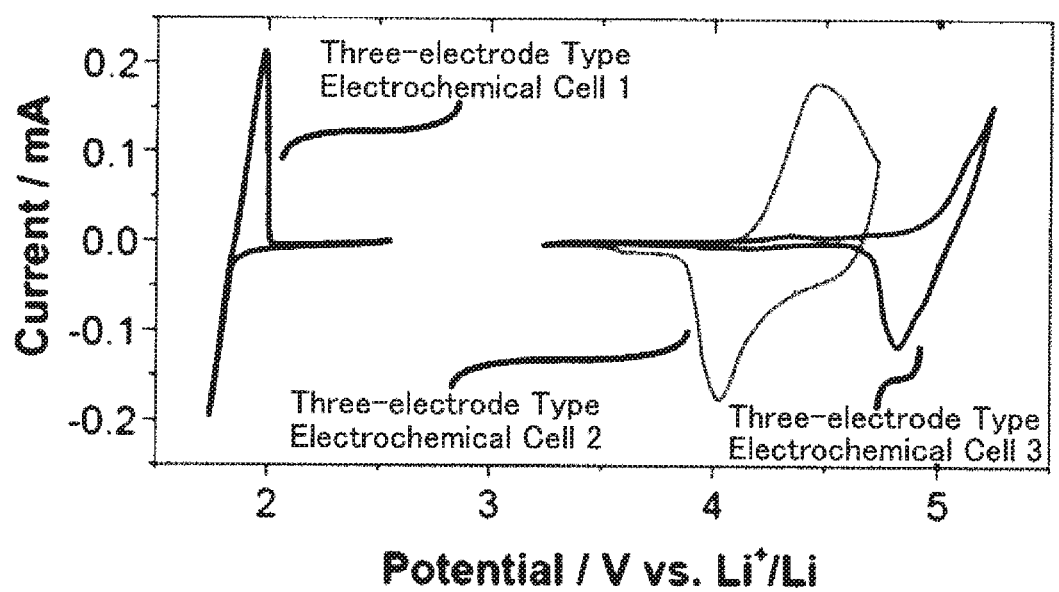
FIG. 19 is a graph showing measurement results of cyclic voltammetry of three-electrode type electrochemical cells 1 to 3 using an electrolytic solution No. 4.

The three-electrode type electrochemical cells 1 to 3 in which the electrolytic solution No. 4 was used each exhibited reversible redox behavior. On the other hand, none of the three-electrode type electrochemical cells 1 to 3 of the comparative example exhibited reversible redox behavior. The cyclic voltammetry measurement results of the three-electrode type electrochemical cells 1 to 3 in which the electrolytic solution No. 4 was used, are shown in FIG. 19. FIG. 19 is considered to demonstrate that the secondary batteries in which the electrolytic solution No. 4 was used operate reversibly even in the case where a material such as $LiNi_{0.5}Mn_{1.5}O_4$ which reacts at approximately 5 V based on lithium metal is used as a positive electrode.

8-5. Metal Corrosiveness Evaluation

In order to evaluate metal corrosiveness of the electrolytic solution of the present invention, linear sweep voltammetry was performed with a three-electrode type electrochemical cell having the following configuration in which the electrolytic solution No. 4 was used, to investigate current change at the oxidizing side or the reducing side. The measuring temperature was set at 25° C., and the sweep rate was set at 0.1 mV/second.

Working Electrode: Pt, Ti, Stainless Steel, Cu, Zn, or Al

Counter Electrode: Platinum

Reference Electrode: Ag/AgCl (Saturated KCl)

For the cells in each of which the working electrode is Pt, Ti, or stainless steel, potential at the oxidizing side was applied. For the cells in each of which the working electrode is Pt, Ti, Cu, Zn, or Al, potential at the reducing side was applied.

From the potential at which the response current occurred, the stability of the metal at the oxidizing side in the presence of the electrolytic solution of the present invention was found to be in order of Ti>Pt≈stainless steel. In addition, the stability of the metal at the reducing side in the presence of the electrolytic solution of the present invention was found to be in order of Al>Zn>Ti>Cu>Pt.

In view of the results of this evaluation and "7. Aluminum Corrosiveness Evaluation", Ti and Al are considered to be preferable as the positive electrode current collector of a power storage device that is operated at high potential, and Al, Zn, Ti, and Cu are considered to be preferable as the negative electrode current collector of a power storage device that is operated at low potential.

8-6. Evaluation of Secondary Battery Including Positive Electrode Active Material and Negative Electrode Active Material A coin type lithium ion secondary battery having the following configuration in which the electrolytic solution No. 4 was used was produced, and charging and discharging was performed at 25° C. and 10 C in a range of 1.7 V to 2.8 V.

Positive electrode: an electrode including a positive electrode mixture layer containing 85 mass % of $LiCoO_2$, 9 mass % of PVDF, and 6 mass % of acetylene black, and a current collector made of Ti.

Negative electrode: an electrode including a negative electrode mixture layer containing 85 mass % of $Li_4Ti_5O_{12}$, 5 mass % of PVDF, and 10 mass % of acetylene black, and a current collector made of Zn.

Separator: a glass fiber nonwoven fabric having a thickness of 420 μm (Whatman GF/F).

Figure 20:
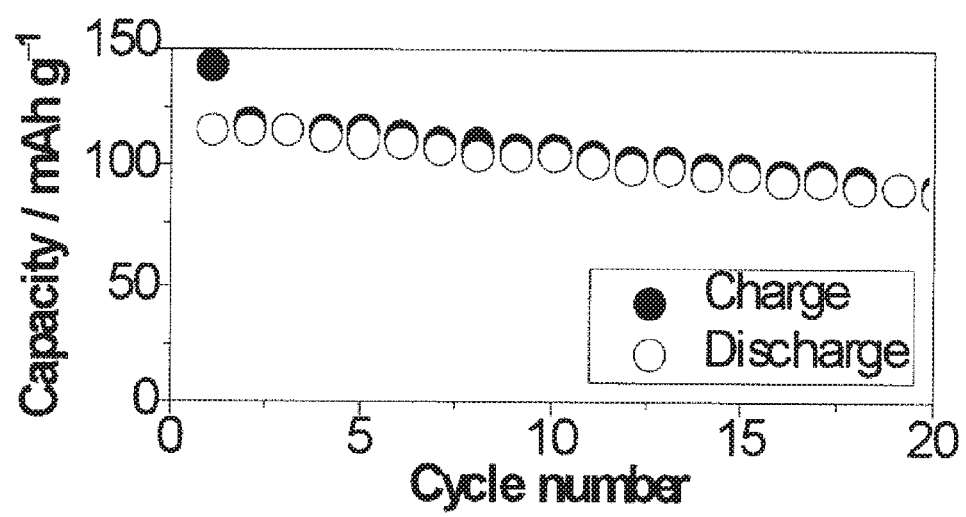
FIG. 20 is a graph of capacity at each charging/discharging cycle when charging and discharging was performed in a range of 1.7 V to 2.8 V on a lithium ion secondary battery using the electrolytic solution No. 4.

The lithium ion secondary battery was confirmed to reversibly operate even when a charging/discharging cycle was repeated. Only slight capacity decrease was observed, which is particularly noteworthy. FIG. 20 shows a graph of capacity of the lithium ion secondary battery at each charging/discharging cycle.

Figure 21:
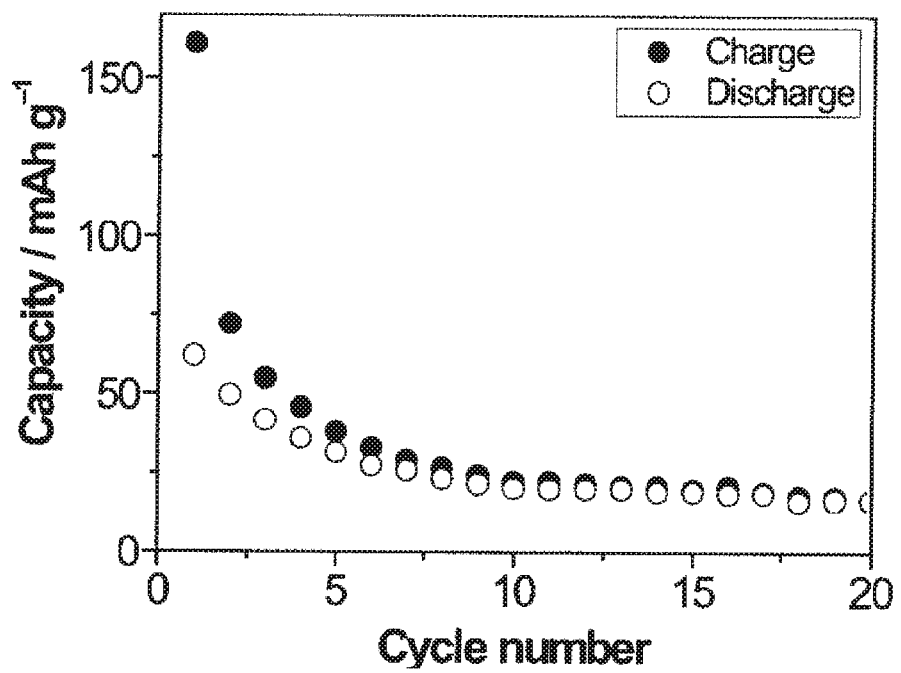
FIG. 21 is a graph of capacity at each charging/discharging cycle when charging and discharging was performed in a range of 1.7 V to 2.8 V on a lithium ion secondary battery using an aqueous solution containing 5.2 mol/L of LiTFSA (salt:solvent=1:2.5 (mole ratio)) as an electrolytic solution.

A coin type lithium ion secondary battery having the same configuration as described above except that an aqueous solution containing 5.2 mol/L of LiTFSA (salt:solvent=1:2.5 (mole ratio)) was used as an electrolytic solution, was produced. With respect to the lithium ion secondary battery, charging and discharging was performed under the same conditions as described above. Capacity decrease was observed, but the lithium ion secondary battery was confirmed to reversibly operate even when a charging/discharging cycle was repeated. FIG. 21 shows a graph of capacity of the lithium ion secondary battery at each charging/discharging cycle.

From the results of the transition of the capacity in FIG. 20 and FIG. 21, the electrolytic solution in which the multiple alkali metal salts were used in combination are considered to achieve significantly excellent effects as compared to the electrolytic solution in which the single alkali metal salt was used.

As a comparative example, a coin type lithium ion secondary battery in which an aqueous solution containing 1.0 mol/L of LiTFSA (salt:water=1:47.4 (mole ratio)) was used as an electrolytic solution, was produced, and the above-described evaluation was performed. However, normal charging and discharging was not performed on the lithium ion secondary battery. The electrolytic solution is inferred to have decomposed.

Furthermore, as a comparative example, a coin type lithium ion secondary battery in which an aqueous solution containing LiTFSA and LiBETA (salt:water=1:50 (mole ratio), LiTFSA:LiBETA=7:3 (mole ratio)) was used as an electrolytic solution, was produced, and the above-described evaluation was performed. However, normal charging and discharging was not performed also on the lithium ion secondary battery. The electrolytic solution is inferred to have decomposed.

8-7. Evaluation 2 of Secondary Battery Including Positive Electrode Active Material and Negative Electrode Active Material A coin type lithium ion secondary battery having the following configuration in which the electrolytic solution No. 4 was used was produced, and charging and discharging was performed at 25° C. and 10 C in a range of 2.4 V to 3.4 V.

Positive electrode: an electrode including a positive electrode mixture layer containing 80 mass % of $LiNi_{0.5}Mn_{1.5}O_4$, 15 mass % of PVDF, and 5 mass % of acetylene black, and a current collector made of Ti.

Negative electrode: an electrode including a negative electrode mixture layer containing 85 mass % of $Li_4Ti_5O_{12}$, 5 mass % of PVDF, and 10 mass % of acetylene black, and a current collector made of Zn.

Separator: a glass fiber nonwoven fabric having a thickness of 420 μm (Whatman GF/F).

Figure 22:
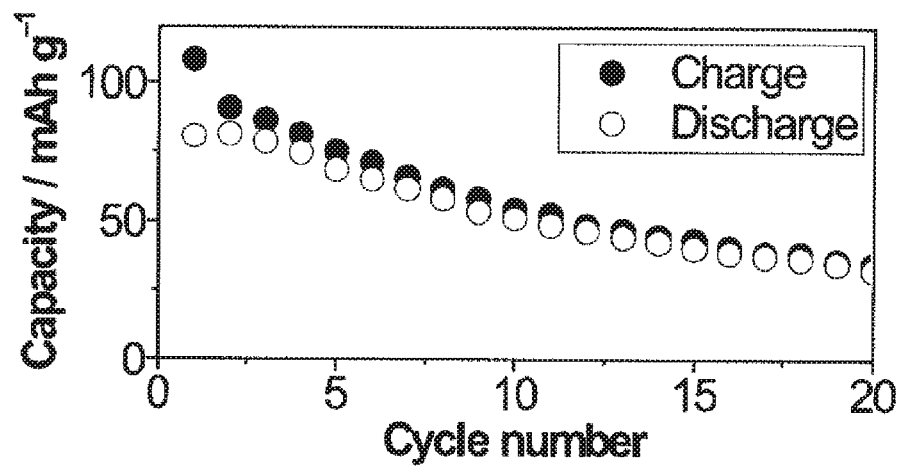
FIG. 22 is a graph of capacity at each charging/discharging cycle when charging and discharging was performed in a range of 2.4 V to 3.4 V on the lithium ion secondary battery using the electrolytic solution No. 4.

The lithium ion secondary battery was confirmed to reversibly operate even when a charging/discharging cycle was repeated. FIG. 22 shows a graph of capacity of the lithium ion secondary battery at each charging/discharging cycle.

8-8. Evaluation 3 of Secondary Battery Including Positive Electrode Active Material and Negative Electrode Active Material A coin type lithium ion secondary battery having the following configuration in which the electrolytic solution No. 11 was used was produced, and charging and discharging was performed at 25° C. and 10 C in a range of 1.7 V to 2.8 V.

Positive electrode: an electrode including a positive electrode mixture layer containing 85 mass % of $LiCoO_2$, 9 mass % of PVDF, and 6 mass % of acetylene black, and a current collector made of Ti.

Negative electrode: an electrode including a negative electrode mixture layer containing 85 mass % of $Li_4Ti_5O_{12}$, 5 mass % of PVDF, and 10 mass % of acetylene black, and a current collector made of Al.

Separator: a glass fiber nonwoven fabric having a thickness of 420 μm (Whatman GF/F).

Figure 23:
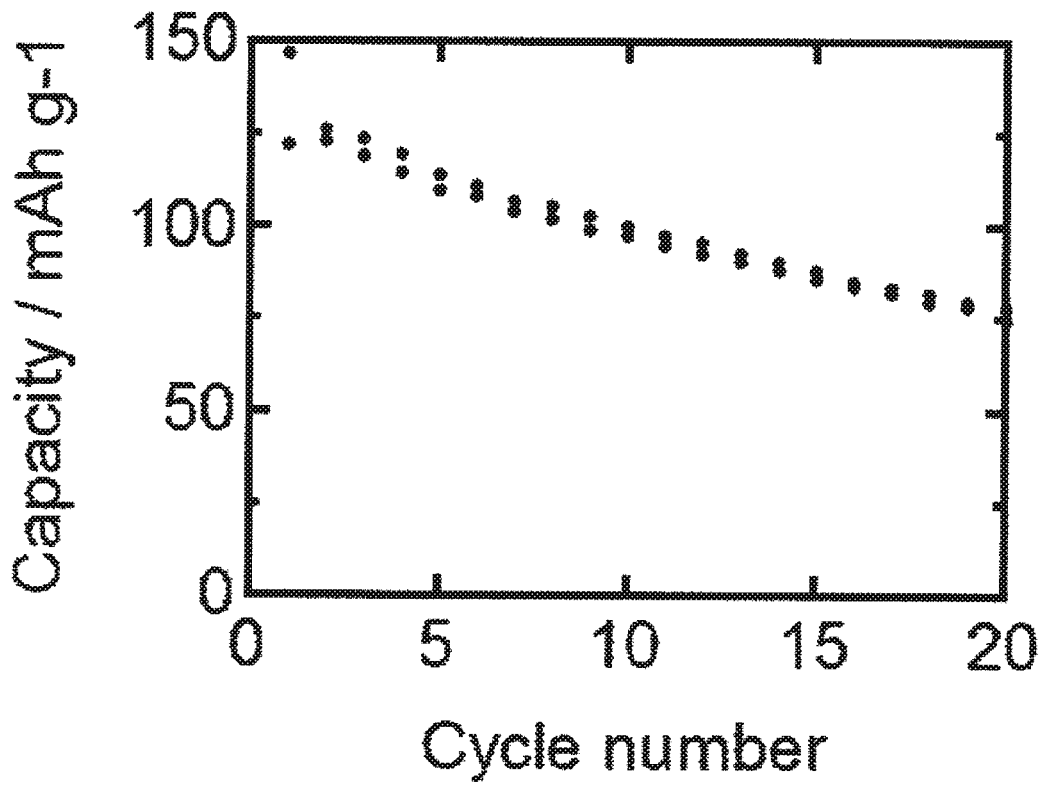
FIG. 23 is a graph of capacity at each charging/discharging cycle when charging and discharging was performed in a range of 1.7 V to 2.8 V on a lithium ion secondary battery using an electrolytic solution No. 11.

The lithium ion secondary battery was confirmed to reversibly operate even when a charging/discharging cycle was repeated. FIG. 23 shows a graph of capacity of the lithium ion secondary battery at each charging/discharging cycle. Regarding plots at each charging/discharging cycle in FIG. 23, the upper plots represent charge capacity, and the lower plots represent discharge capacity.

8-9. Evaluation 4 of Secondary Battery Including Positive Electrode Active Material and Negative Electrode Active Material A coin type lithium ion secondary battery having the following configuration in which the electrolytic solution No. 11 was used was produced, and charging and discharging was performed at 25° C. and 10 C in a range of 2.4 V to 3.4 V.

Positive electrode: an electrode including a positive electrode mixture layer containing 80 mass % of $LiNi_{0.5}Mn_{1.5}O_4$, 15 mass % of PVDF, and 5 mass % of acetylene black, and a current collector made of Ti.

Negative electrode: an electrode including a negative electrode mixture layer containing 85 mass % of $Li_4Ti_5O_{12}$, 5 mass % of PVDF, and 10 mass % of acetylene black, and a current collector made of Al.

Separator: a glass fiber nonwoven fabric having a thickness of 420 μm (Whatman GF/F).

Figure 24:
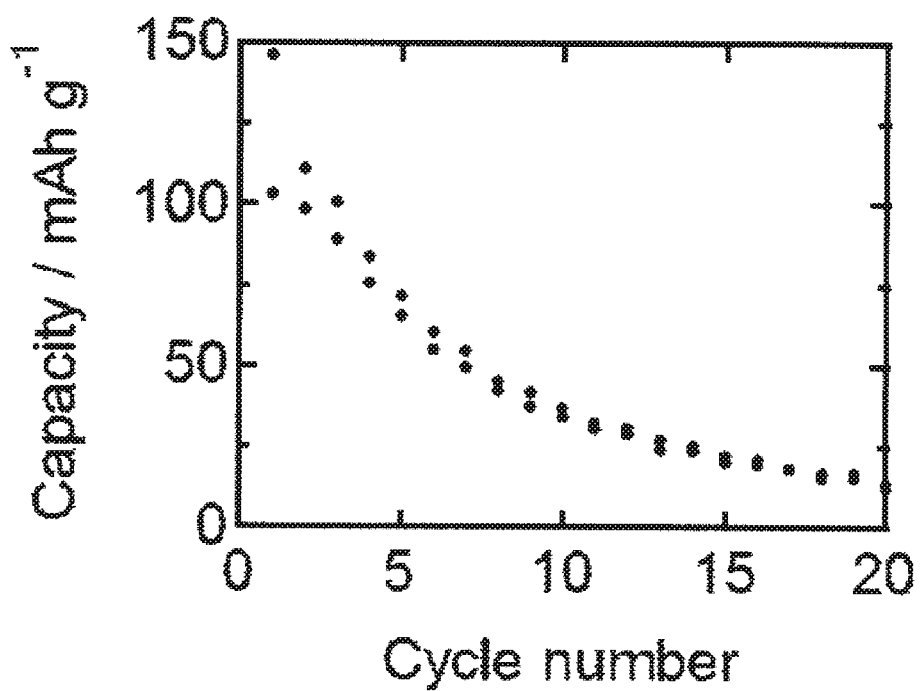
FIG. 24 is a graph of capacity at each charging/discharging cycle when charging and discharging was performed in a range of 2.4 V to 3.4 V on the lithium ion secondary battery using the electrolytic solution No. 11.

The lithium ion secondary battery was confirmed to reversibly operate even when a charging/discharging cycle was repeated. FIG. 24 shows a graph of capacity of the lithium ion secondary battery at each charging/discharging cycle. Regarding plots at each charging/discharging cycle in FIG. 24, the upper plots represent charge capacity, and the lower plots represent discharge capacity.

9. Raman Spectra

Analysis was performed by Raman spectrometry using, as a sample, the electrolytic solution No. 4 (salt:water=1:2 (mole ratio)), an aqueous solution containing 4 mol/L of LiTFSA (salt:water=1:5.7 (mole ratio)), an aqueous solution containing 1 mol/L of LiTFSA (salt:water=1:47.4 (mole ratio)), or water. The Raman spectrum of each sample is shown in FIG. 25.

Figure 25:
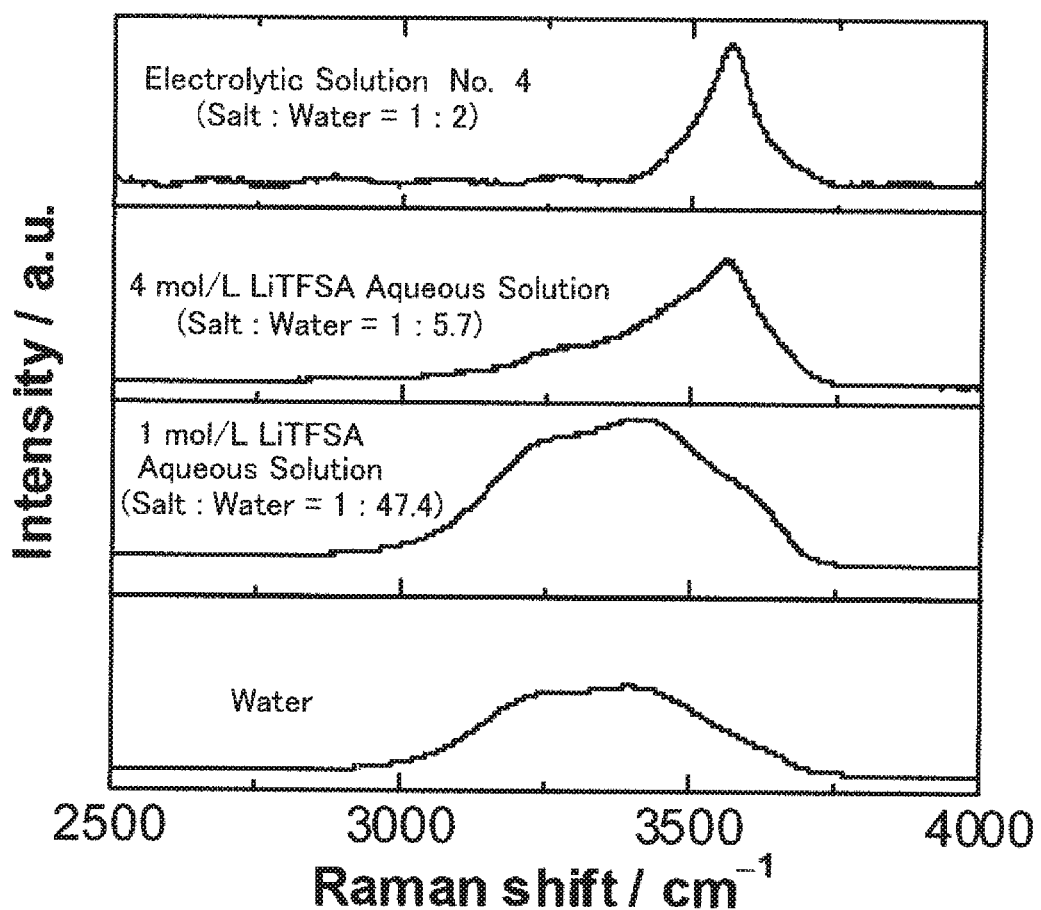
FIG. 25 shows a Raman spectrum of each sample in "9. Raman Spectra".

From FIG. 25, the peak derived from water is found to become sharper, while shifting toward the high wave number side, as the mole amount of water with respect to 1 mol of the alkali metal salt decreases. The electrolytic solution No. 4 is considered to be in a state where nearly all water is coordinated with the alkali metal salt.

Generally, a peak derived from water in a hydrate of a compound is observed as a relatively sharp peak. Therefore, since the peak derived from water of the electrolytic solution of the present invention was observed as being sharp, the electrolytic solution of the present invention is construed as containing a hydrate of the alkali metal salt and being in a state of exhibiting fluidity.

10. Discussion

From the above test results, in the suitable electrolytic solution of the present invention, nearly all water is considered to be coordinated with the alkali metal salt, and water not coordinated with the alkali metal salt is considered to be very little. The water coordinated with the alkali metal salt is thought to be microscopically in a state where the unshared electron pair of oxygen of water is coordinated with alkali metal ions of the alkali metal salt. Here, because of the coordination state of the alkali metal ions and the unshared electron pair of oxygen of water, the unshared electron pair of oxygen is considered to be stabilized. In other words, the energy level of the HOMO of the unshared electron pair of oxygen is inferred to be decreased. Because of the decrease in the energy level of the HOMO, the oxidation resistance of the water molecules contained in the electrolytic solution of the present invention is thought to significantly improve, resulting in the electrolytic solution of the present invention exhibiting a wide potential window.

In addition, as shown in FIG. 19, the redox potential of lithium titanate, which is normally 1.55 V, shifted toward the high potential side in the presence of the electrolytic solution of the present invention. The reasons are thought to be as follow.

First, in the presence of the electrolytic solution of the present invention, in a negative electrode containing lithium titanate, a redox reaction represented by the following chemical formula is thought to take place.

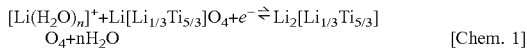

Here, in the redox reaction, when a Nernst formula focusing on the electrolytic solution components is established, the following formula is obtained.

$$E = E^0 - (RT/F)\ln(a_{H2O}{}^n/a_{[Li(H2O)n]})$$

E: negative electrode potential
$E^0$: negative electrode potential determined on the basis of a factor other than the electrolytic solution
R: gas constant
T: absolute temperature
F: Faraday constant
$a_{H2O}$: activity of $H_2O$
$a_{[Li(H2O)n]}$: activity of $[Li(H_2O)n]^+$ In the electrolytic solution of the present invention, the amount of water not coordinated with the alkali metal ions is considered to be smaller than that in a conventional aqueous electrolytic solution. Therefore, in a secondary battery including the electrolytic solution of the present invention, the value of $a_{H2O}$ is inferred to be lower than that in a secondary battery including a conventional aqueous electrolytic solution. Accordingly, in the secondary battery including the electrolytic solution of the present invention, the value of $(RT/F)\ln(a_{H2O}{}^n/a_{[Li(H2O)n]})$ becomes lower than that in the secondary battery including the conventional aqueous electrolytic solution, and the value of E in the above Nernst formula becomes higher than the negative electrode potential of the secondary battery including the conventional aqueous electrolytic solution.

In addition, in the suitable electrolytic solution of the present invention, the amount of water not coordinated with the alkali metal ions is considered to be smaller than the amount of water coordinated with the alkali metal ions. Therefore, in a secondary battery including the suitable electrolytic solution of the present invention, the value of $a_{H2O}$ is inferred to be lower than the value of $a_{[Li(H2O)n]}$. Accordingly, in the secondary battery including the suitable electrolytic solution of the present invention, $(RT/F)\ln(a_{H2O}{}^n/a_{[Li(H2O)n]}) < 0$ is satisfied, and the value of E in the above Nernst formula becomes higher than the negative electrode potential of the secondary battery including the conventional aqueous electrolytic solution.

While the specific embodiments of the present invention have been described in detail, these embodiments are merely illustrative and are not intended to limit the scope of the claims. The invention described in the claims may include various modifications and changes made to the specific embodiments illustrated above.

The invention claimed is:

1. An electrolytic solution for a power storage device, the electrolytic solution containing water as a solvent and an alkali metal salt, the electrolytic solution having a composition in which an amount of the solvent is not greater than 4 mol with respect to 1 mol of the alkali metal salt,
wherein an anion forming the alkali metal salt is a combination of two or more organic anions containing a carbon atom within a structure thereof, and
the organic anions comprise at least one of bis(trifluoromethanesulfonyl) amide ($[N(CF_3SO_2)_2]^-$), bis(perfluoroethanesulfonyl) amide ($[N(C_2F_5SO_2)_2]^-$), (perfluoroethanesulfonyl)(trifluoromethanesulfonyl) amide ($[N(C_2F_5SO_2)(CF_3SO_2)]^-$), $CF_3SO_3^-$ or $C_2F_5SO_3^-$.

2. The electrolytic solution for the power storage device according to claim 1, wherein the organic anions comprise bis(trifluoromethanesulfonyl)amide ($[N(CF_3SO_2)_2]^-$) and bis(perfluoroethanesulfonyl)amide ($[N(C_2F_5SO_2)_2]^-$).

3. The electrolytic solution for the power storage device according to claim 1, wherein the organic anions comprise bis(trifluoromethanesulfonyl)amide ($[N(CF_3SO_2)_2]^-$) and $CF_3SO_3^-$.

4. The electrolytic solution for the power storage device according to claim 1, wherein the alkali metal salt is a lithium salt or a sodium salt.

5. The electrolytic solution for the power storage device according to claim 1, wherein the electrolytic solution has a potential window of not less than 2 V.

6. The electrolytic solution for the power storage device according to claim 1, wherein the power storage device is a secondary battery or a capacitor.

7. The electrolytic solution for the power storage device according to claim 1, wherein the power storage device is a lithium ion secondary battery or a sodium ion secondary battery.

8. A power storage device comprising a positive electrode, a negative electrode, and the electrolytic solution for the power storage device according to claim 1.

9. The power storage device according to claim 8, wherein the power storage device is a secondary battery or a capacitor.

10. The power storage device according to claim 9, wherein the power storage device is a secondary battery, and the secondary battery is a lithium ion secondary battery or a sodium ion secondary battery.

11. The power storage device according to claim 8, wherein the power storage device is a secondary battery, and the positive electrode contains an active material selected from a metal oxide having element lithium, a polyanion-based compound, or a sulfur-based compound.

12. The power storage device according to claim 8, wherein the power storage device is a secondary battery, and the positive electrode contains lithium manganate.

13. The power storage device according to claim 8, wherein the power storage device is a secondary battery, and the negative electrode contains an active material selected from a carbon material, metal lithium, a lithium alloy, a sulfur-based compound, or a lithium metal oxide.

14. The power storage device according to claim 8, wherein the power storage device is a secondary battery, and the negative electrode contains lithium titanate.

15. The power storage device according to claim 9, wherein the power storage device is a capacitor, and the capacitor is an electric double layer capacitor, a lithium ion capacitor, or a sodium ion capacitor.

16. The power storage device according to claim 8, wherein the power storage device is a capacitor, and the positive electrode and/or the negative electrode contains activated carbon.

17. The power storage device according to claim 8, further comprising a current collector made of aluminum, made of titanium, made of stainless steel, made of copper, and/or made of zinc.

18. The electrolytic solution for the power storage device according to claim 1, wherein the solvent is a mixed solvent containing the water and a nonaqueous solvent.

19. The electrolytic solution for the power storage device according to claim 18, wherein a proportion of the water in the mixed solvent is not less than 90% in volume ratio when an entire volume of the mixed solvent is considered to be 100%.

20. The electrolytic solution for the power storage device according to claim 1, wherein a proportion of the water in the solvent is not less than 90% in volume ratio when an entire volume of the solvent is considered to be 100%.

* * * * *